United States Patent
Cermak et al.

(10) Patent No.: US 7,773,974 B1
(45) Date of Patent: Aug. 10, 2010

(54) PRESENCE LITE

(75) Inventors: Gregory Wayne Cermak, Needham, MA (US); Douglas Reynold Jones, Medford, NJ (US); Timothy Wayne Schmidt, Wilton, CT (US); Sandra Kelly Teare, Needham, MA (US); Eric Andrew Goodheart, Brighton, MA (US); Margaret Malagon, Gulph Mills, PA (US); Elizabeth Louise Fuller, Waltham, MA (US); Aaron Joseph Dagen, Brooklyn, NY (US); David Anthony Fay, Still River, MA (US); Piotr Kajetan Boni, Providence, RI (US); Beth Shelley Davis, Acton, MA (US); Dermot Anthony Murray, Mount Vernon, NY (US); Ann Wander Shaub, Gaithersburg, MD (US); Joanne Snare LaCourse, Hudson, MA (US)

(73) Assignee: Verizon Services Corp., Ashburn, VA (US)

( * ) Notice: Subject to any disclaimer, the term of this patent is extended or adjusted under 35 U.S.C. 154(b) by 1001 days.

(21) Appl. No.: 11/236,516

(22) Filed: Sep. 28, 2005

Related U.S. Application Data

(60) Provisional application No. 60/629,158, filed on Nov. 18, 2004.

(51) Int. Cl.
*H04M 11/10* (2006.01)
(52) U.S. Cl. ............ 455/413; 455/414.1; 455/417; 455/421; 455/412.1

(58) Field of Classification Search ........... 455/414.1, 455/415, 417, 412.2
See application file for complete search history.

(56) References Cited

U.S. PATENT DOCUMENTS

| | | | | |
|---|---|---|---|---|
| 5,325,419 A * | 6/1994 | Connolly et al. | ......... | 455/435.1 |
| 5,732,359 A * | 3/1998 | Baranowsky et al. | ...... | 455/552.1 |
| 6,088,589 A * | 7/2000 | Valentine et al. | ............ | 455/433 |
| 6,091,947 A * | 7/2000 | Sumner | ...................... | 455/413 |
| 6,157,831 A * | 12/2000 | Lamb | ......................... | 455/433 |
| 6,185,433 B1 * | 2/2001 | Lele et al. | .................... | 455/528 |
| 2002/0086671 A1 * | 7/2002 | Amin et al. | .................. | 455/432 |
| 2006/0031368 A1 * | 2/2006 | deCone | ...................... | 709/207 |

* cited by examiner

*Primary Examiner*—Temica M Beamer

(57) ABSTRACT

A service is provided to cell phone subscribers to improve reachability. A home location register node maintains state information on a subscriber's cell phone status. Cell phone status information includes: off; on, registered and available to receive calls; on, registered but busy participating in an ongoing call; on, registered but temporarily unavailable; and on, registered but unattended. Temporarily unavailable is further qualified: poor reception location, high interference, cell throughput saturation, intentional user disposition. Long term unavailability may also be inferred and indicated depending on the device and/or system status. When a call to a subscriber's cell phone cannot be completed or is not answered, the service annunciates the reason to the calling party. The calling party can then make a more informed decision as to when to reattempt the call and is more likely to reattempt the call. The service is provided in conjunction with call forwarding to landlines phones and/or voicemail.

22 Claims, 10 Drawing Sheets

PRESENCE LITE

RELATED APPLICATIONS

This application claims the benefit of U.S. Provisional Patent Application Ser. No. 60/629,158 filed on Nov. 18, 2004, titled: "PRESENCE LITE".

FIELD OF INVENTION

The present invention relates generally to systems and methods for forwarding telephone calls and, in particular, to methods and apparatus for determining the status of a called cellular telephone.

BACKGROUND

When a caller places a call to a cell phone which is on, the call is normally routed through a base station acting as an access point. If the call fails to reach a called party, the caller generally receives an indication as to whether the called party is on the phone, i.e., whether the phone is busy or not as reflected in a busy signal or multiple unanswered rings. The call, if it is not successfully completed to the called party, may be transferred to voicemail which may replay a pre-recorded message, e.g., a daily message, on the status of the called party, e.g., "I am in the office today", etc. This information is similar to some "presence" information that may be conveyed in instant messaging. Also, in implementations including versions of the Find Me, Follow Me (FMFM) service concept, known in the art, the caller is given information about the busy status of additional phones, to which the original call may be transferred, as a call is forwarded from one phone to the next in a predefined call transfer sequence.

While existing systems provide some information when a call is not answered or completed, it would be desirable if methods and apparatus were available for a caller to be able to obtain additional "presence-like" information regarding the called party. In particular, it would be advantageous if the calling party could obtain detailed status information regarding the called cellular telephone. For example, if the caller originally places a call to a cellular telephone, it would be desirable for the caller to know if the called cellular telephone is off or on, in addition to whether the called cellular phone is on and busy. In addition, it would be beneficial if called cell phone status information that further qualifies the called cell phone "on" state was available to be provided to the calling party, e.g., "on but currently inaccessible due to system constraints," "on but inaccessible due to called party decision," "on but unattended," "on and busy."

Methods and apparatus that facilitate the availability of such additional information to the calling party would provide the benefit of increasing the likelihood that a caller will decide to call back or leave a message. By providing the caller with detailed called party cell phone status, the caller would then be able make a more informed decision as to when the next calling attempt should be undertaken. Thus, the calling party may no longer feel that he/she is wasting time by making futile calling attempts and the calling party is less likely to become quickly frustrated and abandon calling attempts. In addition, the calling party may be more likely to be in an agreeable mood and be more pleased with the called party, e.g., when a successful call is completed.

Furthermore, some cellular telephone users, e.g., salespeople, job seekers, lonely individuals, etc., would find it highly desirable and beneficial from a financial and/or social perspective to receive more calls from people who have their cellular telephone numbers. Methods and apparatus that provide feedback on a cellular phone's status to the calling party would tend to encourage the calling party to try again, if currently unsuccessful. Such cellular telephone users would be predisposed to subscribe to such a service provided by a service provider as either an individual add-on service or as part of a wider service package, thus having a tendency to increase revenues and/or customer base for a service provider offering such a feature.

SUMMARY OF PREFERRED EMBODIMENTS

The present invention is directed to methods and apparatus used to maintain status information on cellular telephones, determine the current status of a called cellular telephone, and provide such determined status information to the calling party. Features of the present invention are in some embodiments, implemented in conjunction with call forwarding implementations. Such implementations may include call forwarding to landline phones and/or voicemail services.

Various systems and methods, implemented in accordance with the present invention, are directed to the problem of reaching an individual when calling a cell phone number, particularly when the called party's cellular telephone is not getting proper reception or is turned off. By re-routing a call directed to a cell phone to a landline number at times, in accordance with one feature of some embodiments of the present invention, it is possible to save money and/or provide better speech quality than would have been possible had the call been routed through the cellular telephone as requested. One cause for redirection to a landline phone can be inability to complete and/or maintain the call to the cell phone due to poor reception. In some embodiments, at least some calls placed to cell phones are intentionally redirected, in accordance with the present invention, to landline phones when the called cell phone is not getting proper reception. In some embodiments, at least some calls placed to cell phones which could have been completed to the cell phone, are intentionally redirected, in accordance with the present invention, to landline phones as a function of called cell phone operator commands. In some embodiments, the redirection commands may be issued prior to the call being placed. In some embodiments, redirections commands are issued and implemented at the time the placed call is ringing the called cell phone.

Some existing wireless networks detect the basic operational status of a cell phone, i.e., off, on, or busy, and on the basis of such detected status information can perform operations such as routing calls. Various novel systems and methods, in accordance with the present invention, take advantage of such available information and functionality by reporting such status information to callers; routing calls to another network or to voicemail may be performed in conjunction with the called cell phone status reporting to the calling party. Further, in some embodiments, an alerting function notifies the called party, at a later time when the called party becomes available, that an incoming call has been missed. In some embodiments, such notifications include indications as to whether or not called party status information had been provided to the calling party and may also include the status information if such information was provided.

Some embodiments of the present invention include additional features and enhancements directed to detecting, collecting and reporting additional information on the status of a called cell phone. One novel feature informs a caller with detailed status as to the called party's cellular telephone. For example, the information may include whether the called party's cellular telephone phone is off, on but busy, on but temporarily unavailable, or on but unattended. The on-but-temporarily-unavailable information may be provided where temporary signal loss is detected, e.g., as in the case of signal interference or loss due to change in position. In addition, the on-but-temporarily-unavailable status can, in some embodiments, be further qualified in terms of temporarily unavailable due to system issues or temporarily unavailable due to a called party's intentional choice. For example, temporarily-unavailable-due-to-system-conditions may include: unavailable due to poor reception due to cell phone location in a dead spot, unavailable due to poor reception due to high interference levels, and unavailable due to scheduling conflicts, e.g., capacity saturation within the called party's currently located cell. An example of temporarily unavailable due to user selection can include a called party in an important meeting responding to his/her ringing cell phone by recognizing the calling party via caller ID and intentionally performing an input operation on his/her cell phone to initiate a transfer of the incoming call to voicemail, so as not to disrupt the in progress meeting. Another example, of temporarily unavailable due to a user selection can include a called party intentionally performing an input operation on his/her cell phone which is known to initiate a call transfer to a landline phone, the landline phone being at the same location at which the called party is currently located.

In various embodiments of the present invention, the caller may infer the state of the called party from the information provided on the state of the called cellular telephone. This information provided can influence the calling party's decision as to when to attempt to again initiate the call. Further, in various embodiments, calls to a cellular telephone may be transferred to a landline phone, and/or voicemail, if the call is not completed to the cellular telephone. In some embodiments, the transfer and/or reason for transfer is announced to the caller, who can then accept or break off the call as he or she chooses.

In accordance with various embodiments of the invention, the amount of time a user has been unreachable can be used for making the inference as to whether the user is temporarily unreachable as opposed to unreachable for an extended period of time. The amount of time the user has been unreachable along with the reason the user has been unreachable can, and in various embodiments is, communicated to the calling party. This information can be communicated with information indicating whether it has been inferred that the called party is temporarily unreachable or is expected to be unreachable for an extended period of time. Temporary unreachability may be in the time frame of a few minutes or under in hour while long term unreachability, in some embodiments, is communicated when the called party is expected, based on the available state information, to be unreachable for an hour or more.

User unavailability for an extended period of time, e.g., more than a threshold period which can be specified by the user in some embodiments or set by the system, results in an inference that the called party's unavailability is long term. However, in the case of the unavailability have only just occurred or having a duration less than the predetermined threshold, it is usually inferred, if the called party's cell phone is registered, that the unavailability is temporary. Thus, while the called party may be unavailable for a particular reason, additional information, such as the duration for which the called party has been unavailable, can produce an inference of temporary or long term unavailability. In the case of an inference of temporary unavailability this is usually communicated to the calling party by an announcement that the called party is "temporarily unavailable" with the reason being communicated in the same message to the caller. In the case of inferred long term unavailability, the caller may be notified that the party is unavailable with the reason that the called party is unavailable, e.g., the calling party may receive an audio announcement that "the called party is currently unavailable due to signal interference". The amount of time the called party has been unavailable due to the particular condition may also be communicated to the calling party in the case of an inference of either temporary or long term unavailability because of a particular condition. For example, the calling party may be played the message "the called party is unavailable due to signal interference and has been unavailable for the last 5 minutes".

Reporting of called cell phone status information, routing calls, and alerting, in accordance with the present invention may occur after a cellular telephone user has registered with the wireless network. In some embodiments this registration occurs manually, i.e., the cell phone user calls in to the network and enters an access code or performs some similar steps in order to achieve registration.

In some embodiments, registration is performed automatically by the wireless cellular network, e.g., as part of ongoing housekeeping functions. By avoiding a manual registration cell phone user operation is simplified and encouraged.

In one exemplary automatic registration process of a cellular telephone, in an exemplary wireless communications network, performed following cell phone power on, includes operating the cell phone to send, e.g., periodically, a registration request signal. If a local base station receives the registration request signal and determines that the signal quality is sufficient to establish a wireless communication link, the base station may in turn send a reply signal to the wireless terminal signifying that the cell phone is being accepted for registration and may use the base station as its point of network attachment. The Base station then also signals the cell phone's Home location register (HLR) Node that the cellular telephone is activated and capable of receiving signals, which could in turn enable an interconnection between the cellular and landline networks for the activated cell phone.

The base station may determine temporary changes in reachability status of the cell phone based upon information derived from received signals, and/or the lack of a received signal from the cell phone. Other changes in temporary reachability status may include the base station scheduler denying a cell phone access, e.g., due to heavy scheduling requirements. Changes in reachability status of the cell phone as determined by the base station are, in some embodiments, forwarded to the home location register node where the state information corresponding to the cell phone is updated. Different mechanisms may be used for the forwarding of changes in reachability status of the cell phone from the base station's, e.g., as a change is observed, periodically, and/or based on a request from the Home location register node. The request from the Home location register node can be made in response to a received request to complete a call.

When a cell phone user moves to a new cell and decides to use a different base station as its point of network attachment, the cell phone may automatically register via the new base station, resulting in the new base station signaling the cell phone's Home location register node to record the new registration information which will replace the previously recorded registration information.

In some embodiments, as part of a service offered to cell phone users, a user's cell phone status information maintained, e.g., in the Home location register Node, is made available, and provided to calling parties when a call cannot be completed to the called party. In some embodiments, a user's cell phone status information maintained, e.g., in the Home location register Node, is made available, and provided to calling parties when a call cannot be completed to the called party, and as part of a service available to users at least some called party cell phone status information, is restricted from being forwarded to at least some calling parties, e.g., as part of a cell phone status blocking service offered to cell phone users.

Some embodiments include a call-logging function. Some embodiments include making information available to callers in real time or near real time. Some embodiments include incorporation with a phone activity monitor (PAM) such as is known to those skilled in the art, compatibility with 802.11 networks, and smart handsets.

In some embodiments various services and/or features, in accordance with the present invention, are employed in applications including group subscriptions to a service provider. For example, a small business could subscribe to various called party cell phone status and inference services in accordance with the present invention so that calls from one person to another in the same company could carry this additional information, e.g., messages providing additional information and inferences on the status of the called party relating to a reason why a placed call to a cell phone is not successfully completed or answered. In some embodiments of the present invention involving group subscriptions, the group comprises a set of family members. In some other embodiments of the present invention involving group subscriptions, the group comprises a group of individuals that have authorized a common association. In some such embodiments involving group subscriptions, presence lite information relating to members, in accordance with the present invention, would be provided to valid calling numbers corresponding to other group members but not to other callers. Screening lists are established and maintained to support such functionality.

Numerous additional features, benefits and embodiments are described in the detailed description which follows.

DETAILED DESCRIPTION OF PREFERRED EMBODIMENTS

Figure 1:
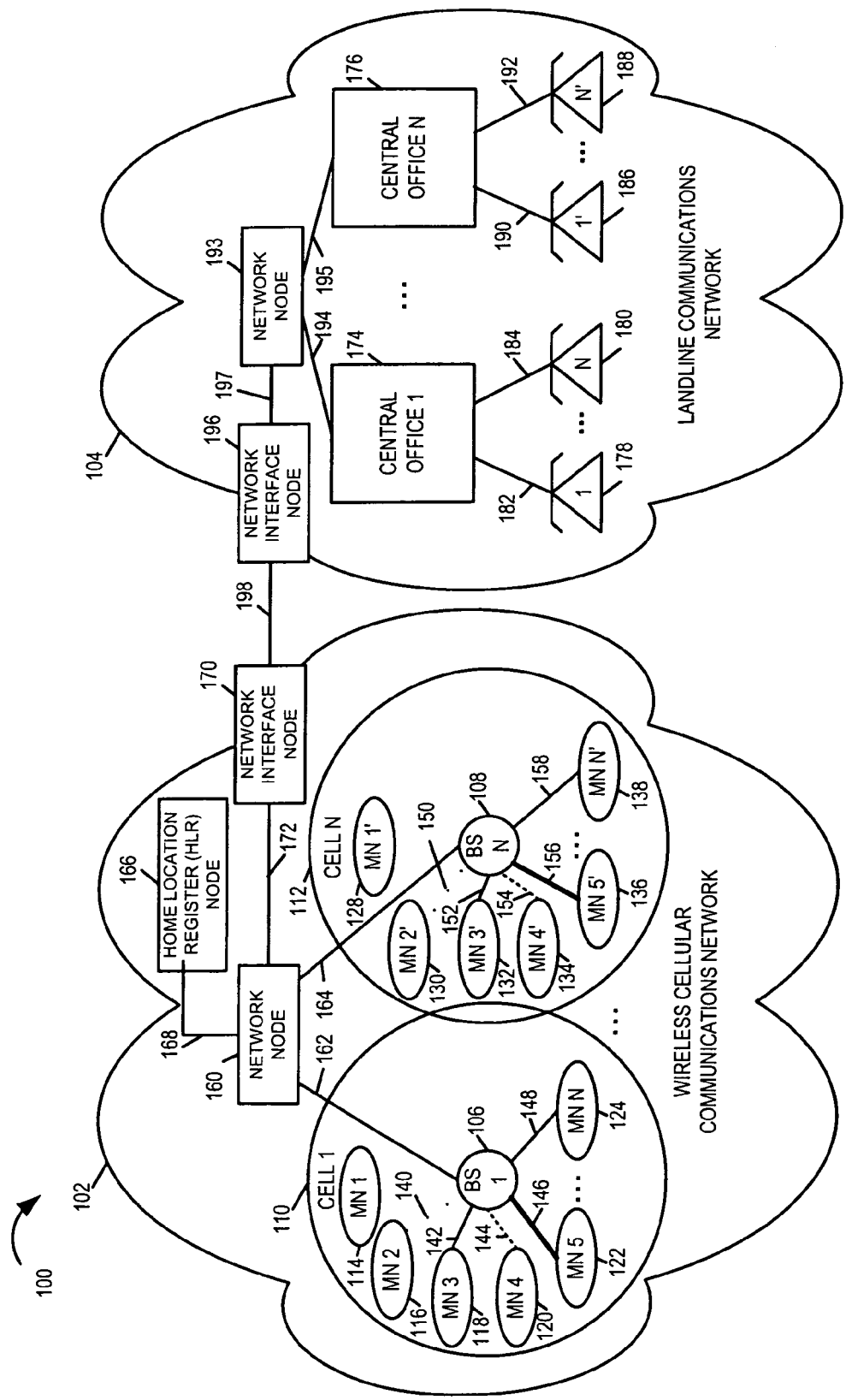
FIG. 1 is a drawing of an exemplary system implemented in accordance with the present invention and using methods of the present invention.

FIG. 1 is a drawing of an exemplary system 100 implemented in accordance with the present invention and using methods implemented in accordance with the present invention. System 100 includes a wireless cellular communications network 102 and a landline communications network 104. The wireless cellular communications network 102 includes a plurality of base stations (BS 1 106, BS N 108), with each base station (106, 108) having a corresponding wireless cellular coverage area represented as a cell (cell 1 110, cell N 112), respectively. Wireless cellular communication system 102 also includes a plurality of cell phones, e.g., mobile nodes (MN 1 114, MN 2 116, MN 3 118, MN 4 120, MN 5 122, MN N 124, MN 1' 128, MN 2' 130, MN 3' 132, MN 4' 134, MN 5' 136, MN N' 138, which may move throughout the system 102. A cell phone within a base station's cell may register with the base station and use that base station as its access point or point of network attachment.

In exemplary wireless cellular communications network 102 as illustrated in FIG. 1, MNs 1-N (114, 116, 118, 120, 122, 124) are located within cell 1 110. MNs can be in different states of operation at different times. MN 1 114 represents an exemplary cell phone which is located in cell 1 110, but is not powered on and is not currently registered to use BS 1 106 as its point of network attachment. MN 2 116 represents an exemplary cell phone which is in the process of registering to use BS 1 106 as its point of network attachment and is coupled to BS 1 106 via wireless link 140. MN 3 118 represents an exemplary cell phone which is currently registered to use BS 1 106 as its point of network attachment, is coupled to BS 1 106 via wireless link 142, and is currently available to receive an incoming call. MN 3 118 may or may not be attended to at the present time, which can also influence whether or not a call can be completed to MN 3 118. MN 4 120 represents an exemplary cell phone which is currently registered to use BS 1 106 as its point of network attachment, is coupled to BS 1 106 via wireless link 144, and is temporarily unavailable to receive an incoming call, e.g., due to poor reception. MN 5 122 represents an exemplary cell phone which is currently registered to use BS 1 106 as its point of network attachment, is coupled to BS 1 106 via wireless link 146, and is unavailable to receive an incoming call because MN 5 is currently busy participating in an ongoing call. MN N 124 represents another exemplary cell phone which may be in any arbitrary state of operation, and when coupled to BS 1 106 is coupled via wireless link 148.

In exemplary wireless cellular communications network 102 as illustrated in FIG. 1, MNs 1'-N' (128, 130, 132, 134, 136, 138) are located within cell N 112. MN 1' 128 represents an exemplary cell phone which is located in cell N 112, but is not powered on and is not currently registered to use BS N 108 as its point of network attachment. MN 2' 130 represents an exemplary cell phone which is in the process of registering to use BS N 108 as its point of network attachment and is coupled to BS N 108 via wireless link 150. MN 3' 132 represents an exemplary cell phone which is currently registered to use BS N 108 as its point of network attachment, is coupled to BS N 108 via wireless link 152, and is currently available to receive an incoming call. MN 3' 132 may or may not be attended to at the present time, which can also influence whether or not a call can be completed to MN 3' 132. MN 4' 134 represents an exemplary cell phone which is currently registered to use BS N 108 as its point of network attachment, is coupled to BS N 108 via wireless link 154, and is temporarily unavailable to receive an incoming call, e.g., due to poor reception. MN 5' 136 represents an exemplary cell phone which is currently registered to use BS N 108 as its point of network attachment, is coupled to BS N 108 via wireless link 156, and is unavailable to receive an incoming call because MN 5' 136 is currently busy participating in an ongoing call. MN N' 138 represents another exemplary cell phone which may be in any arbitrary state of operation, and when coupled to BS N 108 is coupled via wireless link 158.

Base stations (106, 108) are coupled to a network node 160, e.g., a router, via network links (162, 164), respectively. Network node 160, is coupled to a home location register node 166 via network link 168. Home location register node 166 maintains state information on each of a plurality of mobile nodes, e.g., storing information on whether or not the mobile node is currently registered, storing information identifying the base station being currently used as the point of network attachment when registered, and storing information on the operational status of mobile nodes. In accordance with one feature of the present invention, operational status state information on a called cell phone can be returned to the calling party when a call cannot be completed. Network node 160 is also coupled to a network interface node 170 via network link 172. Network interface node 170 may perform protocol conversions and provide network edge security functions. Networks links (162, 164, 168, 172) may be, e.g., fiber optic cables.

System 100 also includes a landline communications network 104. Landline communications network 104 includes a plurality of Central Offices (Central Office 1 174, Central Office N 176). Central Office 1 174 is coupled to a plurality of landline telephone devices (landline telephone 1 178, landline telephone N 180) via links (182, 184), respectively. Central Office N 176 is coupled to a plurality of landline telephone devices (landline telephone 1' 186, landline telephone N' 188) via links (190, 192), respectively. Links (182, 184, 190, 192) may be, e.g., Plain Old Telephone Service (POTS) Cu lines. Central Offices (174, 176) are coupled to network node 193, e.g., a router, via network links 194, 195, respectively. Network node 193 is coupled to network interface node 196 via network link 197. Network interface node 196 may perform protocol conversion operations and provide network boundary security functions. Network interface node 196 is coupled to network interface node 170 via network link 198 coupling the landline communications network 104 with the wireless cellular communications network 102. Network links (194, 195, 197, 198) may be, e.g., fiber optic links.

Figure 2:
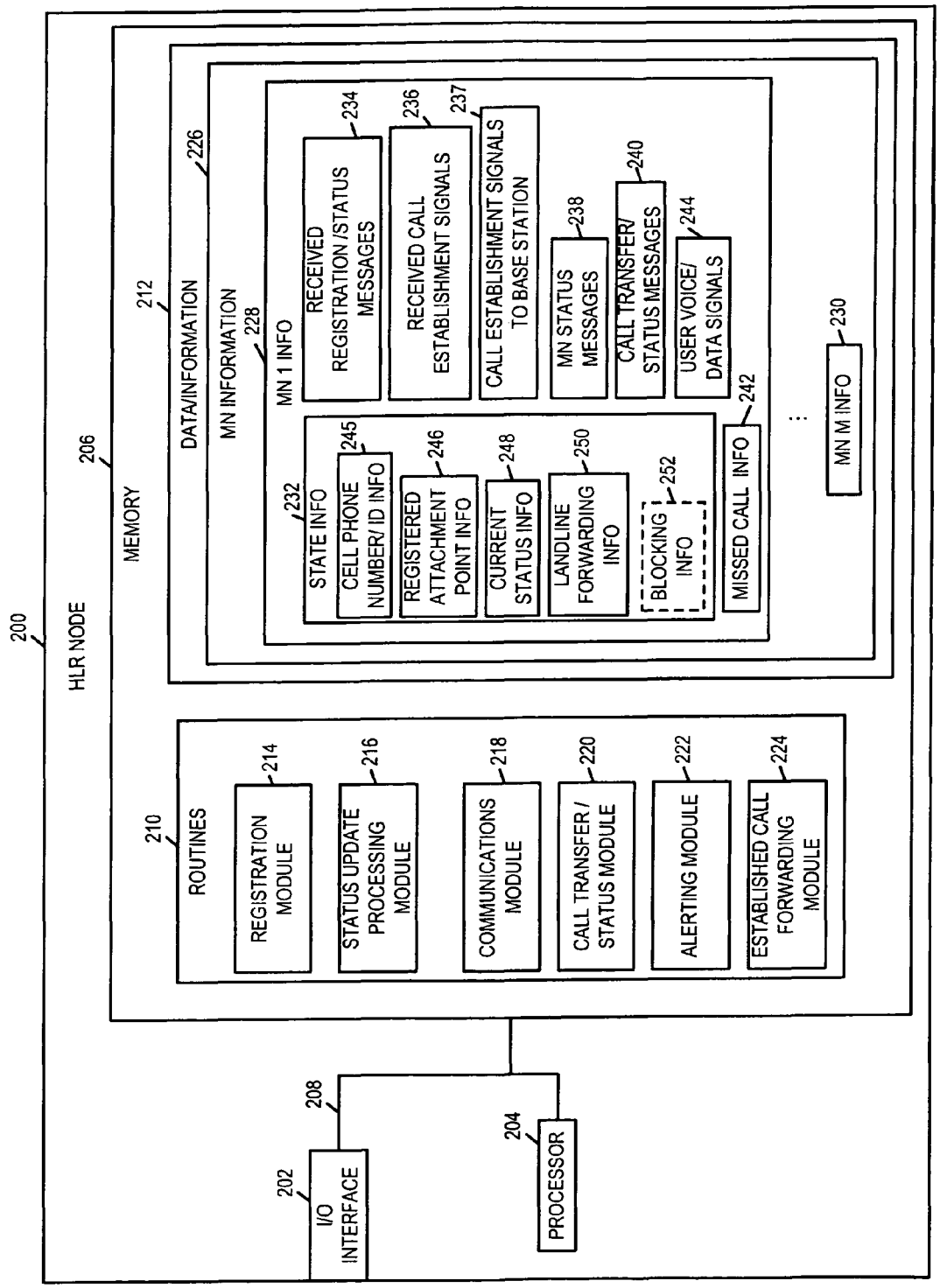
FIG. 2 is a drawing of an exemplary Home location register node implemented in accordance with the present invention and using methods of the present invention.

FIG. 2 is a drawing of an exemplary home location register node 200 implemented in accordance with the present invention and using methods implemented according to the present invention. Exemplary home location register node 200 may be the home location register node 166 of FIG. 1. Home location register node 200 includes an I/O interface 202, a processor 204, and memory 206 coupled together via bus 208 over which the various elements may interchange data and information. Memory 206 includes routines 210 and data/information 212. The processor 204, e.g., a CPU, executes the routines 210 and uses the data/information 212 to control the operation of the home location register node 200 and implement methods of the present invention.

Routines 210 includes a registration module 214, a status update processing module 216, a communications module 218, a call transfer/status module 220, an alerting module 222, and an established call forwarding module 224. Data/information 212 includes mobile node information 226 including a plurality of sets of mobile node information (MN 1 information 228, MN M information 230). Each set of MN info (228, 230) corresponds to one of the mobile nodes in the wireless communications system for which the home location register node is responsible to store state information (e.g., the address of the current point of network attachment). New incoming calls directed to a mobile node are routed based on information in the home location register node. The incoming calls may be from another mobile node or a landline communications device. In some embodiments, multiple home location register nodes 200 are used in the wireless communications system with the full set of mobile nodes being divided among the plurality of home location register nodes 200. In some systems, base stations include home location register functionality described with respect to node 200 and serve as the home location register for a set of mobile nodes.

MN 1 information 228 includes state information 232, received registration/status messages 234, received call establishment signals 236, call establishment signals to base station 237, MN status messages 238, call transfer/status messages 240, missed call information 242, and user voice/data signals 244. State information 232 includes cell phone number/identification information 245, registered attachment point information 246, current status information 248, landline forwarding information 250, and, in some embodiments, blocking information 252.

Registration module 214 receives registration/status messages 234 from base stations, e.g., each time a mobile node whose home location register is home location register node 200, requests registration and is accepted for registration by a base station. The mobile node may have been powered on and registered to use one particular base station as its point of network attachment but has now moved into a new cell and seeks to register with a new base station to obtain a new point of attachment to the network. As another possibility, the mobile node may have been previously powered off and just powered up, and the registration process is part on an automatic initialization process. Registration module 214 obtains received registration/status messages 234. The registration module 214 processes the message 234 identifying the mobile node and stores state information included in the message, e.g., registered attachment point information 246 and current status information 248. Registered attachment point information 246 may include an identifier identifying the specific base station in the wireless system and an address associated with that base station for use in forwarding. Current status information 248 that may be included in message 234 includes, e.g., information indicating that the MN 1 is powered on and available to receive incoming calls.

Status update processing module 216 receives MN status messages 238 from the base stations of already registered mobile nodes indicating changes in mobile node status. Status update processing module 216 updates registered attachment point information 246 and/or current status information 248 based on received MN status messages 238. The MN status message 238 may indicate that the currently registered base station has not received any signaling from MN 1 for a specified timeout interval and the base station has decided to de-register MN 1 and consider it off. As another example, the MN status message 238 may indicate that MN 1 is still registered with the same BS, but is temporarily unavailable to receive incoming calls, e.g., due to poor reception resulting from the location of MN 1 and/or system interference levels. Another exemplary MN status message may indicate that MN 1 is still registered with the same BS, but is temporarily unavailable to receive incoming calls, e.g., due to cell capacity levels being exceeded. As still another example, the MN status message may indicate that MN 1 is still registered with the same BS, but is temporarily unavailable to receive incoming calls, e.g., due to MN 1 user selection to redirect the call, e.g., to a landline or answering service. An exemplary MN status message may indicate that a call has been established and is in progress, so the mobile node is considered busy. After a call has terminated, an MN message 238 may indicate that the call has terminated and that the MN is now available to receive new incoming calls.

Communications module 218 performs operations including processing signals including requests to establish a new call with one of the mobile nodes for which node 200 is serving home location register functionality. A received call establishment message 236 is a request to complete a call to a specific MN, e.g., identified by phone number/ID matching the MN state information phone number/ID, e.g. MN 1 cell phone number/ID info 245. The originating device may be a landline communication device, e.g., phone from a landline communications network or another mobile node, e.g., another cell phone from the same or a different wireless cellular communications network. Communications module 218 checks the state information, associated with the requested called party mobile node, e.g., MN 1 state info 232. If the called mobile node is currently registered with a base station and the current status information indicates that the mobile node is available to receive an incoming call, then the communications module 218 can attempt to complete the call by sending call establishment signals 237 to the mobile node's registered base station. Assuming that the call is answered by the called party, the home location register node can change the current status information 248 to indicate that the called mobile node is now registered, on and busy due to an in progress call. The communications module 218 can notify the established call forwarding module 224 to direct user voice/data signals 244 to the address of the base station to which the called MN is currently registered. The established call forwarding module 224 redirects user voice/data signals 244 for established calls as per stored MN state information. In some embodiments and/or under some conditions, the communications module 218 as part of completing a call will notify the calling party of the address of the registered base station corresponding to the called MN, and the user voice/data signals may be sent directly to the base station without traversing the home location register node 200.

If the communications module 218 when checking the state information, associated with the requested called party mobile node, e.g., MN 1 state info 232, determines the call cannot be completed to the called party, the communications module can direct operation to the call transfer/status module 220. The call transfer/status module 220 can send call transfer/status messages 240 toward the calling party. The call transfer/status messages 240 can include state information on the called party mobile node, e.g., cell phone status. An exemplary call transfer/status message 240 includes information identifying why the call cannot be completed at the current time, e.g., cell phone is currently registered but temporarily unavailable due to poor reception. Such cell phone status information can be played to the calling party. In addition, in some embodiments, the status information is accompanied by a transfer operation, e.g., to one or more landline phone in succession, to voicemail, or to one or more landline phones in succession and if unsuccessful to voicemail. In some embodiments, the status of the cell phone and the call transfers are announced to the caller, who can then break off the call as he/or she chooses. Landline forwarding information 250 includes numbers of landline phones and/or voicemail direction information which the call transfer/status module 220 can use to direct calls intended for MN 1 which cannot be completed.

In some embodiments, landline forwarding information 250 may include information identifying that a call or calls from a specific calling party number should be transferred, e.g., based upon MN 1's operator's discretion.

In some embodiments, blocking information 252 is included. The blocking information 252 includes information identifying that called cell phone status information corresponding to at least some possible incoming calls to cell phone MN 1 which cannot be completed should not be forwarded. Various qualifications can be placed on the restriction of cell phone status information. For example, the blocking can be implemented for each of the incoming calls indefinitely until rescinded, or blocking can be implemented for some fixed designated time interval or intervals. The blocking can be implemented for: an identified calling party or parties and/or calling party number or numbers. Blocking information 252 can be used by the call transfer/status module 220 when generating call transfer/status messages, e.g., supporting a filtering capability.

In some embodiments and/or under some conditions, the call transfer/status module 220 does not transfer the incoming call which cannot be completed to another phone number or voicemail, but simply sends a message 240 back to the calling party indicating that the call cannot be completed and including called party cell phone status information, if permitted in view of the blocking information.

The alerting module 222 stores missed call information 242, when a call cannot be completed to an MN. For example, if MN 1 misses an incoming call, information is stored in missed call information 242. The missed call information 242 include information pertaining to the missed call, e.g., calling party name, calling party number, date, time of day, reason for missed call, e.g., line busy, off and not registered, registered but temporarily unavailable, etc. The missed call information 242 may also include information identifying the information presented to the calling party, redirection information, e.g., redirection phone number(s) and/or voicemail direction information. In some embodiments, the missed call information 242 may also include information indicating the calling party's response, e.g., when the calling party hung up. When the MN becomes accessible, the alerting module 222 can signal the MN and notify the MN of the missed call information, such that the MN can respond if the MN user so desires. In some embodiments, the alerting module 222 signals the called party that a call is being missed at the time the call is being missed, if the reason for the missed call is that the called party is currently busy participating in a different ongoing call.

Figure 3:
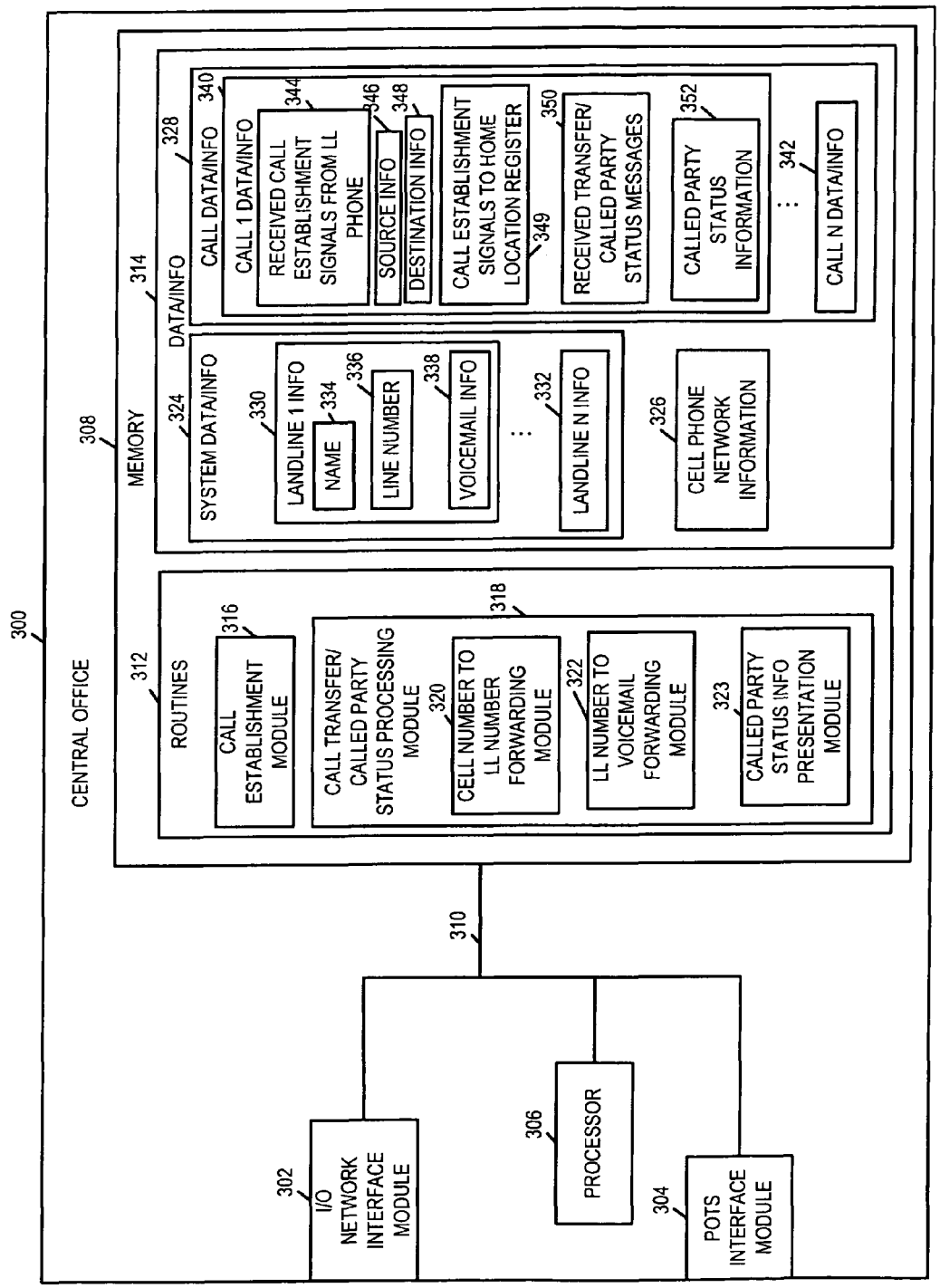
FIG. 3 is a drawing of an exemplary Central Office implemented in accordance with the present invention and using methods of the present invention.

FIG. 3 is a drawing of an exemplary Central Office 300, which may be any of the exemplary central offices (174, 176) of FIG. 1. Exemplary Central Office 300 includes an I/O network interface module 302, a POTS interface module 304, a processor 306, and a memory 308 coupled together via a bus 310 over which the various elements may interchange data and information. I/O network interface module 302 interfaces the Central Office 300 to other network nodes within the landline communications network. POTS interface module 304 interfaces each of the individual POTS lines supported by the Central Office to the Central Office 300, thus providing an I/O interface for a plurality of landline telephone users. Memory 308 includes routines 312 and data/information 314. The processor 306, e.g., a CPU, executes the routines 312 and uses the data/information 314 in memory 308 to control the operation of the Central Office 300 and implement the methods implemented according to the present invention.

Routines 312 include a call establishment module 316 and a call transfer/called party status processing module 318. The call transfer/called party status processing module 318 includes a cell number to landline number forwarding module 320, a landline number to voicemail forwarding module 322, and a called party status information presentation module 323.

Data/information 314 includes system data/information 324, cell phone network information 326, and call data/information 328. System data/information 324 includes a plurality of sets of landline information (landline 1 information 330, landline N information 332). Landline 1 information set 330 includes a name 334 associated with the landline billing, a line phone number 336, and voicemail information 338 associated with the voicemail to which unanswered calls on landline 1 are redirected, if a voicemail service is implemented on the landline. Cell phone network information 326 includes information associated with cellular networks to which the landline network may be coupled, e.g., information that may be used to identify that a call being placed through a landline phone via POTS interface 304 is being directed to a cell phone rather than to a landline phone, and information allowing the identification of the routing to reach the correct cellular network supporting the called party's cell phone.

Call data/information 328 includes a plurality of sets of call data/information (call 1 data/information 340, call N data/information 342). Each set of call information (340, 342) corresponds to a call attempt originating from one of the POTS lines supported by Central Office 300. Call 1 data/information 340 includes received call establishment signals from landline phone 344, source information 346, destination information 348, call establishment signals to home location register 349, received transfer/called party status messages 350, and called party status information 352. Received call establishment signals 344 includes signals received from a landline phone supported by the Central Office 300 indicating that a call be placed to another phone, e.g., a cell phone. Received call establishment signals to home location register 349 includes call establishment signals sent out from the Central Office 300 via I/O network interface module 302 and directed toward the called party, e.g., toward the home location register node in the wireless cellular network supporting the called cell phone. Source information 346 includes the calling party phone number, identity information, and routing information associated with the calling party. Destination information 348 includes the called party's phone number, and routing information associated with the called party. The destination information 348 may be changed as a result of the call transfer module 318, e.g., when a called cell phone cannot be accessed. Received transfer/called party status messages 350 includes feedback messages from the called cell phone's home location register node provided when the called cell phone cannot be reached and/or transfer redirection information. Called party status information 352 is extracted from received transfer/called party status messages 350. Called party status information 352 includes, e.g., information identifying whether the called cell phone is on or off, information conveying registration status, and when the called phone is on and currently registered but inaccessible, information indicating the reason for the inaccessibility, e.g., line busy, called party does not answer call, temporarily inaccessible due to poor reception, temporarily inaccessible due to user selection, temporarily inaccessible due to cell capacity saturation. Further qualification may be placed upon the reason for temporary inaccessibility due to poor reception, e.g., dead spot, high system interference level. Further qualification may also be placed upon the reason for temporary inaccessibility due to user selection, e.g., automatic transfer to a landline or voicemail, manual transfer to a landline or voicemail.

Call establishment module 316 receives call establishments signals 344 from the POTS module 304 and generates outgoing call establishment signals 349 directed toward the called party's home location register node via I/O interface network module 302, e.g., to initiate a communications session set-up. Call transfer/called party status processing module 318 processes signals received in response to a requested call to a cell phone which cannot be completed, e.g., signals including received transfer/called party status messages 350. The signals received by the call transfer/called party processing module 318 may also indicate that the placed call be redirected to another landline phone or phones and/or voicemail. Cell number to landline number forwarding module 320 handles redirection of an uncompleted call placed to a cell phone to a landline phone number, e.g., as directed in the received signaling received from the called cell phone's home location register node. Landline number to voicemail forwarding module 322 directs a call that is unanswered by a landline phone to a voicemail corresponding to the landline number, e.g., using the association provided in a set of landline information, e.g., landline 1 information 330.

In some embodiments, the called cell phone's home location register directs a calling party to a landline phone, and the landline network does further redirection if the call goes unanswered by the landline number. In other embodiments, the cell phone's home location register provides a series of redirections, each contingent upon the previous redirection going unanswered, and the series of redirections may end in a voicemail. In some embodiments, called party cell phone status information is reported to the calling party prior to redirection. In some embodiments, called party cell phone status information is reported to the calling party concurrent with redirection from the called cell phone. In some embodiments, each subsequent redirection is announced to the calling party so that the calling party can decide to continue or terminate the calling attempt. In some embodiments, called party cell phone status information is reported to the calling party and no redirection occurs.

Called party status information presentation module 323 extracts called party status information 352 from received transfer/called party status messages 350, controls the presentation of the message to the calling party, e.g., in terms of time of presentation, e.g., prior to any call transfer operation or during a call transfer operation, and/or in terms of format of presentation, e.g., voice model used to generate the message, and the called party status information presentation module 323 implements the presentation to the calling party. In some embodiments, the formatting of presentation is performed in the cellular network of the called cell phone, and the called party status information presentation module 323 acts as a conduit presenting the formatted message to the calling party when directed.

Figure 4:
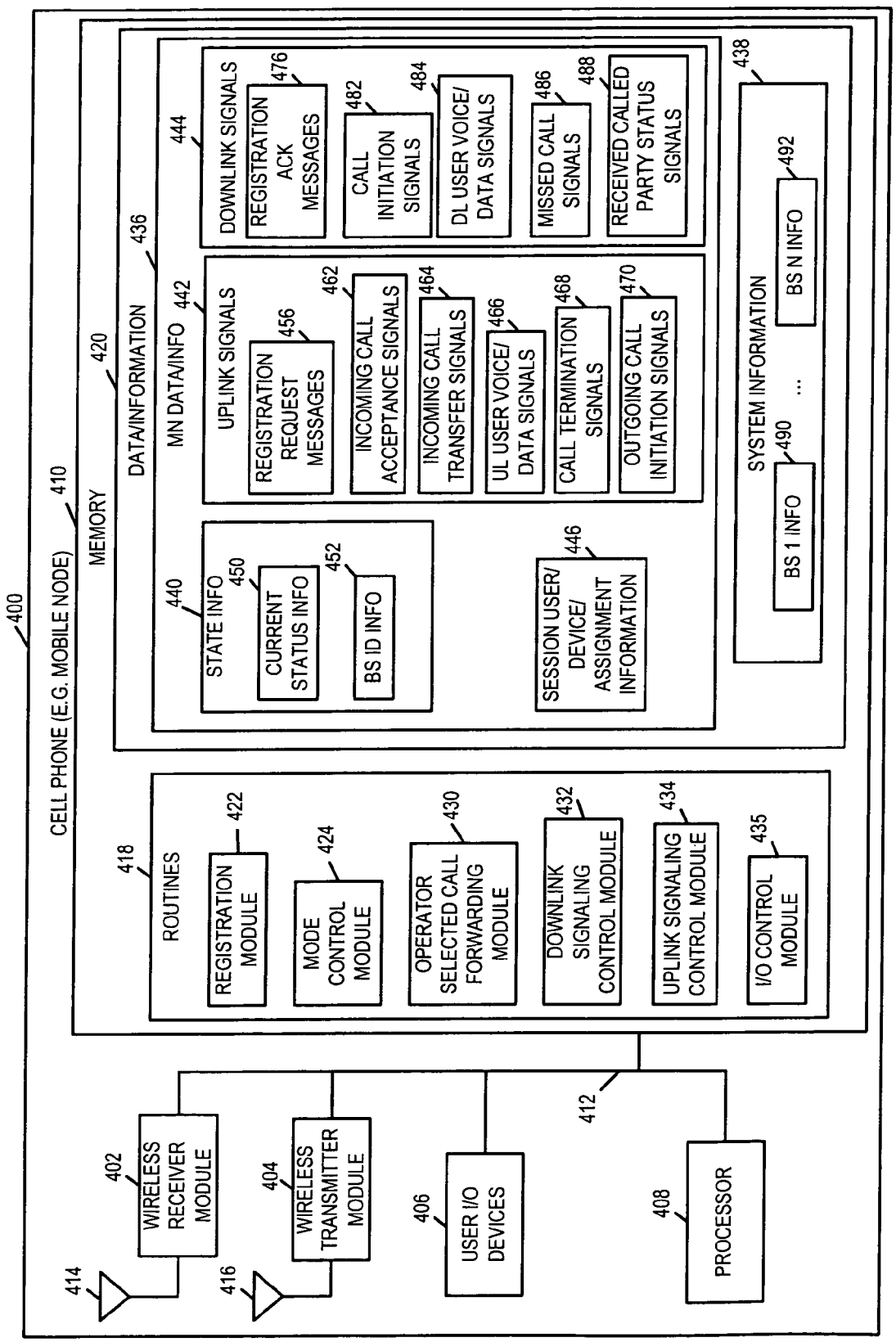
FIG. 4 is a drawing of an exemplary cell phone, e.g., mobile node, implemented in accordance with the present invention and using methods of the present invention.

FIG. 4 is a drawing of an exemplary cell phone, e.g., mobile node, 400, implemented in accordance with the present invention and using methods of the present invention. Exemplary mobile node 400 may be any of the exemplary mobile nodes (114, 116, 118, 120, 122, 124, 128, 130, 132, 134, 136, 138) of FIG. 1. Exemplary mobile node 400 includes a wireless receiver module 402, a wireless transmitter module 404, user I/O devices 406, a processor 408, and memory 410 coupled together via a bus 412 over which the various elements may interchange data and information. The wireless receiver module 402 is coupled to a receive antenna 414 through which the mobile node 400 may receive downlink signals 444 from base stations. The wireless transmitter module 404 is coupled to a transmit antenna 416 through which the mobile node can transmit uplink signals 442 to base stations. In some embodiments, the same antenna is used for both the receiver module 402 and transmitter module 404.

User I/O devices 406 includes, e.g., microphone, speaker, keypad, switches, displays, camera input, etc. through which an operator of mobile node 400 can power on or power off MN 400, initiate calls, accept calls, direct calls to be transferred, view information related to calls such as calling party number, missed call information, received called party state information, send and receiver user voice and data information, terminate calls, and initiate shutdowns.

Memory 410 includes routines 418 and data/information 420. The processor 408, e.g., a CPU, executes the routines 418 and uses the data/information 420 in memory 410 to control the operation of the mobile node 400 and implement the methods of the present invention. Routines 418 includes a registration module 422, a mode control module 424, an operator selected call forwarding module 430, a downlink signaling control module 432, an uplink signaling control module 434, and an I/O control module 435. Data/information 420 includes MN data/information 436, and system information 438. MN data/information 436 includes state information 440, uplink signals 442, downlink signals 444, and session user/device/assignment information 446.

State information 440 includes current status information 450 and BS identification information 452. Current cell phone status information 450 includes, e.g., information identifying current ON/OFF status, information identifying registration status, e.g., unregistered, in process of registering, registered, information further defining a registered powered on state of operation, e.g., actively participating in a call, available to receive a call, temporarily unavailable to receive a call based on poor reception, temporarily unable to receive a call based on user selection, in the process of a call set-up, in the process of a call termination. Base station identification information 452 includes information identifying the specific base station from among a plurality of base stations in the cellular communications system, the specific base station being the base station at which the cell phone is currently registered to use as its point of network attachment otherwise referred to as its access point. A base station is sometimes referred to as an access node.

Uplink signals 442 include registration request messages 456, incoming call acceptance signals 462, incoming call transfer signals 464, user voice/data signals 466, call termination signals 468 and outgoing call initiation signals 470. Downlink signals 444 include registration acknowledgement messages 476, call initiation signals 482, user voice/data signals corresponding to answered calls 484, missed call signals 486, and received called party status signals 488, e.g., messages conveying called party state information.

Registration module 422 controls registration operations of cell phone 400 with base stations, e.g., when the cell phone 400 is powered on, and/or when cell phone 400 moves from one cell to another cell. Registration module 422 generates registration request messages 456 which are sent to base stations and receives registration acknowledgement messages 476 from the base station signifying acceptance of the registration request.

Mode control module 424 controls mode changes in the cell phone, e.g., implementing a power on command, implementing a call initiation, implementing a call termination. Mode control module 424 may generate call termination signals 468, outgoing call initiation signals 470 and process received call initiation signals 482.

Operator selected call forwarding module 430 receives user input directing an incoming call or call to be transferred, and then generates incoming call transfer signals 464. For example, the user of MN 400, a powered on currently registered MN, may decide to temporarily transfer each of the incoming calls so as not to be disturbed, e.g., during a meeting, or to stop his/her cell phone from ringing. Alternatively, a user may decide to transfer a particular incoming call, e.g., based upon a recognized caller identification. Or the user may decide to transfer incoming calls, based on the fact that the user is currently located at the site of a landline phone to which the incoming call will be redirected, and the user recognizes that he/she will have superior line quality by using the landline to receive the incoming call instead of the cell phone to which the call is directed.

Downlink signaling control module 432 controls the operation of wireless receiver module 402 and the reception of downlink signals 444. Uplink signaling control module 434 controls the operation of wireless transmitter module 404 and the transmission of uplink signals 442. I/O control module 435 controls the operation of user I/O devices 406.

Missed call signals 486 include information collected by alerting module 222 of home location register node 200, which may be used to notify mobile node 400 of calls that were not successfully completed to MN 400, e.g., for any of a number of various reasons such as MN off, MN busy with another call, MN unreachable due to system conditions, MN unreachable due to user selection, etc. Missed call signals 486 may include calling party identification information, date and time tag information, and/or called party status information presented to the calling party. Information in missed call signals 486 is presented to the user via user I/O devices 406 under the control of I/O control module 435.

Received called party status signals 488 includes messages directed to MN 400, when MN 400 has initiated a call to another cell phone, and the call cannot be completed to the other cell phone. Received called party status signals 488 includes messages explaining the reason why the call was not completed to cell phone, e.g., phone off, phone busy, phone inaccessible due to poor reception, call being transferred due to a landline due to operator choice, phone inaccessible due to cell loading consideration.

Session user/device/assignment information 446 includes information identifying routing and peer nodes in communications sessions with MN 400, assignment information assigned by a base station scheduler to MN 400 to be used to establish a call and/or to be used during an established call. Uplink user voice/data signals 466 and downlink user voice/data signals 484 include the payload information being conveyed between the calling party and the called party during an established call.

System information 438 includes a plurality of sets of base station information (BS1 information 490, BS N information 492). Each set of BS information (490, 492) corresponding to one of the base stations that exists in the wireless communications system at which MN 400 can attempt to register through and use as its point of network attachment. Each set of information (490, 492) may include information pertinent to the base station, e.g., base station identifier, frequencies used, etc.

Figure 5:
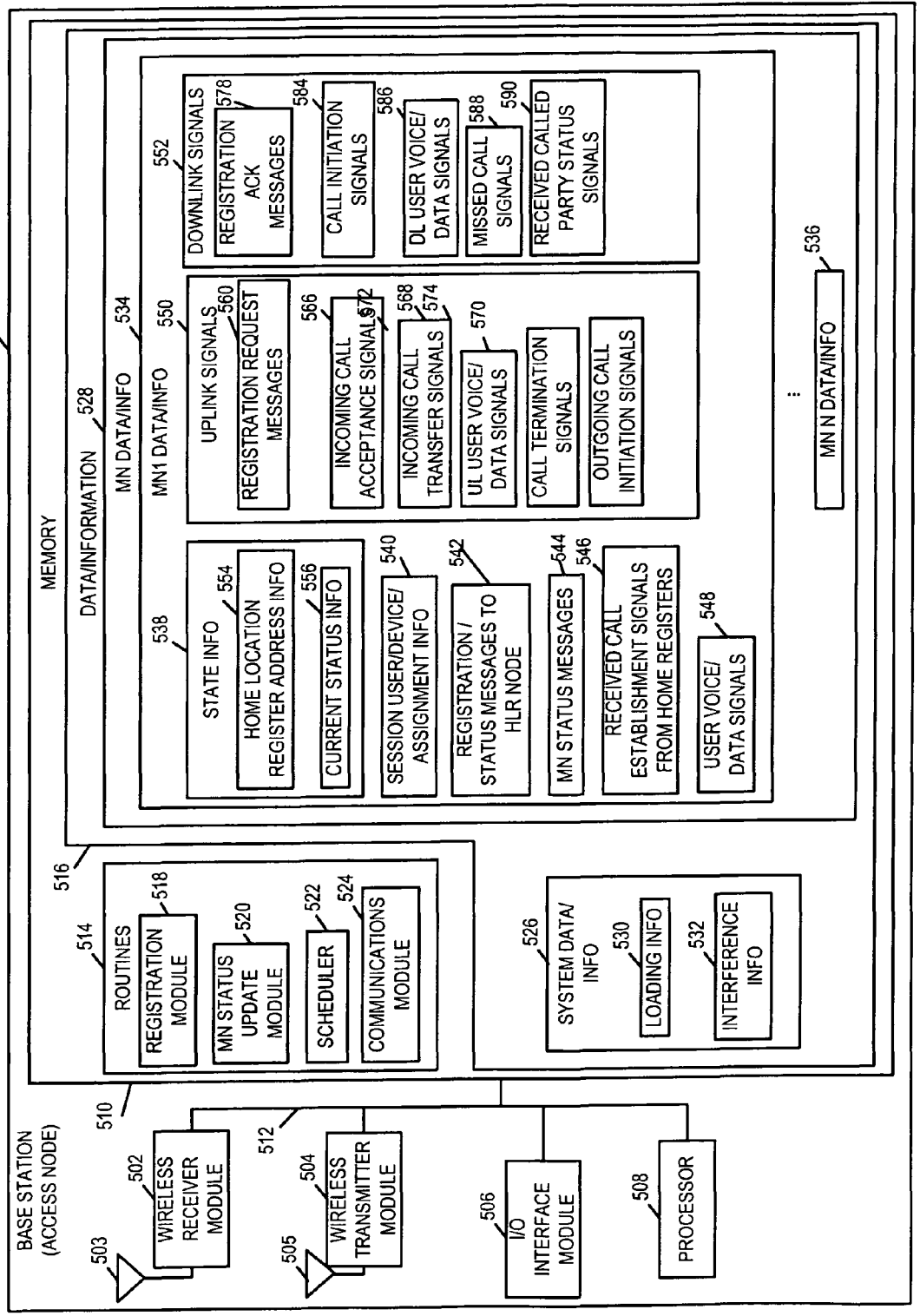
FIG. 5 is a drawing of an exemplary base station (access node), implemented in accordance with the present invention and using methods of the present invention.

FIG. 5 is a drawing of an exemplary base station (access node) 500, implemented in accordance with the present invention and using methods of the present invention. Exemplary base station 500 may be any of the base stations (106, 108) of system 100 of FIG. 1. Exemplary base station 500 includes a wireless receiver module 502, a wireless transmitter module 504, an I/O interface module 506, a processor 508, and memory 510 coupled together via a bus 512 over which the various elements may interchange data and information. Memory 510 includes routines 514 and data/information 516.

The processor 508, e.g., a CPU, executes the routines 514 and uses the data/information 516 in memory 510 to control the operation of the base station 500 and implement the methods of the present invention. The wireless receiver module 502 is coupled to a receive antenna 503 through which the base station 500 receives uplink signals from a plurality of cell phones, e.g., mobile nodes. The wireless transmitter module 504 is coupled to a transmit antenna 505 through which the base station transmits downlink signals to mobile nodes. The I/O interface module 506 couples the base station 500 to other network nodes, e.g., router nodes, home location register nodes, network interface nodes, etc., thus facilitating connectivity between a cell phone, e.g., mobile node, in the cell serviced by BS 500 with other cell phones in different cells and/or with landline phones in a landline communications network.

Routines 514 include a registration module 518, a mobile node status update module 520, a scheduler 522, and a communications module 524. Data/information 516 includes system data/information 526 and mobile node data/information 528.

Registration module 518 performs registration control operations including: receiving registration request messages 560 from MNs, considering received registration requests, generating and transmitting registration acknowledgement messages 578 to MNs, generating and sending registration/status messages 542 to home location register nodes. The registration module 518 also stores state information for registered MNs, e.g., home location register address 554. MN status update module 520 controls operations including: receiving and processing uplink signals indicative of MN status changes including: incoming call acceptance signals 566, incoming call transfer signals 568, call termination signal's 572, and outgoing call initiation signals 574. MN status update module 520 also determines system loading and system interference levels. Based on received and determined information in view of the criteria stored in the base station, the MN status update module 520 changes current status information, e.g., information 556 associated with MN 1, and generates and sends MN status messages 544 to home location register nodes. Scheduler 522 schedules assignments to registered MNs in its cell. Scheduler 522 processes received call establishment signals 546 from home location register nodes and responds to incoming call acceptance signals 566 from MNs. Communications module 524 controls operations of wireless receiver module 502, wireless transmitter module 504, and I/O interface module 506, implements communication protocols used by the base station, performs conversion operations. Communications module 524 implements signaling operations including control and information signaling conveying registration status and/or transfer signaling as well as user voice/data signaling.

System data information 526 includes loading information 530 and interference information 532. Loading information 530 includes information identifying when the cell capacity is saturated, and a call to a mobile node cannot be completed. Interference information 532 includes information identifying current levels of air link interference. Interference information 532 includes information identifying when the level of interference is such that a call should not be attempted to be completed to a called mobile node because the interference will prevent the call from completing, will prevent the call from being maintained, or is expected to result in unacceptably low call quality. In some embodiments, interference information 532 also includes information identifying when the level of interference is sufficient to support, complete, and maintain a call to a cell phone with at least minimally acceptable call quality, but it might be advantageous to route the call to an alternate landline phone instead of the cell phone to achieve a higher level of call quality.

MN data/information 528 includes a plurality of sets of data/information (MN 1 data/information 534, MN N data/information 536). MN 1 data/information 534 includes state information 538, session user/device/assignment information 540, registration/status messages to home location register 542, MN status messages 544, received call establishment signals from home location registers 546, user voice/data signals 548, uplink signals 550 and downlink signals 552.

State information 538 includes home location register address 554 and current status information 556. Home location register address 554 is the address of the home location register node 200 which is the home location register for MN 1. Current status information 556 is information identifying the status of MN 1. Some exemplary statuses of MN 1 may include, e.g., the following: in the process of registration operations, registered ON and available to accept a call, registered and ON but currently unavailable to accept a call due to poor reception, registered and ON but currently unable to accept a new call due to an ongoing call in progress, registered and ON but currently not responding, e.g., called party is not answering an attempted call that is ringing the cell phone, registered and ON but not accepting calls due to operator commands, de-registered by BS 500 due to no received signals for a specified length of time currently registered and powered on but unable to receive calls due to base station cell capacity saturation, currently registered and powered on but unable to receive calls due to high levels of interference, etc.

Session/user/device/assignment information 540 includes information pertaining to active sessions, e.g., calls in progress such as the phone number, address, and/or routing information associated with the peer in the communications session, assignments associated with the communications session.

Registration/status messages to the home location register 542 and MN status messages 544 are messages generated by the base station and transmitted via I/O interface module 506 to MN 1's home location register node 200. Received call establishment signals 546 are received via I/O interface module 506 from MN 1's home location register node 200. (Registration/status messages 542, MN status messages 544, and received call establishment signals 546) in base station 500 correspond to (received registration/status messages 234, MN status messages 238, and call establishment signals 237), respectively in home location register node 200, which have been previously described, and the description shall not be repeated for the purposes of brevity.

User/voice data signals 548 include completed call payload information being communicated via base station 500 from or to MN 1. Some user voice/data signals 548 may have been forwarded through home location register node 200, while other voice/data signals 548 may have bypassed the home location register node 200 in the signal routing path, the signal routing path being a portion of the communications path, between MN 1 and the peer node in the communications session with MN 1. For example, the portion of the communications path may be between the base station 500 and a cellular network interface node. User/voice data signals 548 includes received user voice/data signals which communications module 524 converts to downlink user voice/data signals for MN1, and transmitted user voice/data signals which communications module 524 has generated from received UL user voice/data signals from MN 1.

Uplink signals 550 include registration request messages 560, incoming call acceptance signals 566, incoming call transfer signals 568, uplink user/voice data signals 570, call termination signals 572, and outgoing call initiation signals 574. Uplink signals 550 are received from MN 1 via antenna 503 and wireless receiver module 502. Downlink signals 552 include registration acknowledgement messages 578, call initiation signals 584, downlink user voice/data signals 586, missed call signals 588, and received party status signals 590. Downlink signals 552 are generated by base station 500 and transmitted via wireless transmitter module 504 and transmit antenna 505 to mobile node 1. Similarly named signals in uplink signals 550 and downlink signals 552 in base station 500 correspond to similarly named signals in uplink signals 442 and downlink signals 444 in MN 400, which have been described in detail with respect to MN 400, and thus the descriptions shall not be repeated for purposes of brevity.

Figure 6:
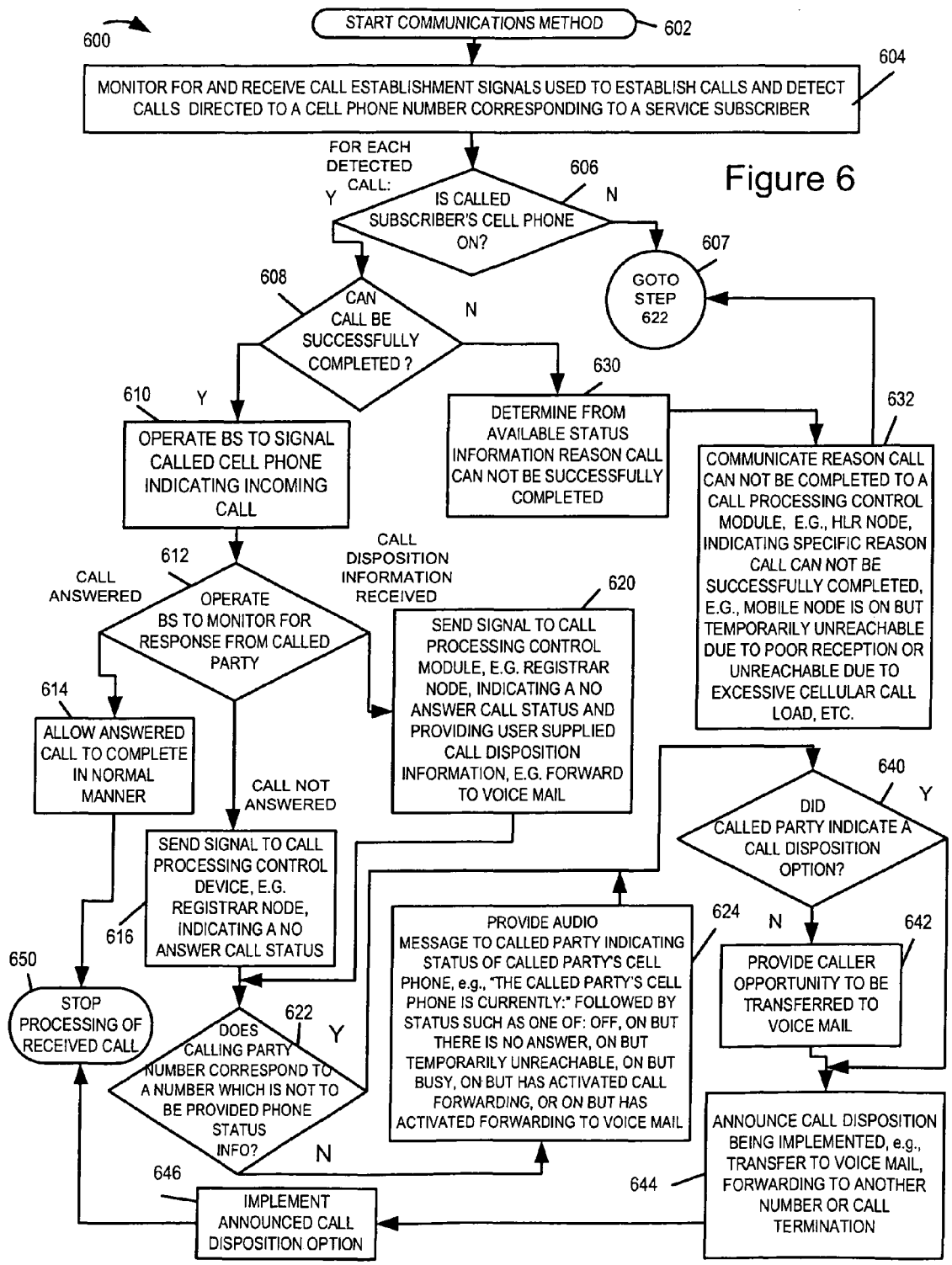
FIG. 6 illustrates the various steps of an exemplary embodiment of the communications service of the present invention which can be used to service cell phone calls.

FIG. 6 illustrates the various steps 600 of the communications service of the present invention which can be used to service cell phone calls. The method shown in FIG. 6 may be implemented by the communications system shown in FIG. 1 when operated in accordance with the invention. The method starts in step 602 in which the various system components are initialized for service. Once active, a network component, e.g., the HLR node 166 which is accessed to obtain information used to route cell phone calls, monitors for call establishment signals used to establish a call to a cell phone corresponding to a telephone number of a service subscriber. The establishment signal, e.g., a signal sent to the HLR node 166 to determine which cell a call should be routed to, normally includes the called party telephone number which can be used to identify a call directed to a service subscriber. In step 604, the HLR node can detect a call to a service subscriber by comparing the called party telephone number to a set of telephone numbers corresponding to cell phone service subscribers who also subscribe to the service of the present invention. For each detected call to a service subscriber cell phone, operation proceeds to step 606. In step 606, the HLR node determines if the called subscriber's cell phone is on. This can be done by checking phone status information stored in the HLR node's database. The database is periodically updated based on information received from the various base stations to which the HLR node 166 is coupled directly or indirectly.

If it is determined that the called subscriber's cell phone is not active, operation proceeds from step 606 to step 622 via GOTO step 607. However, if it is determined that the subscriber's cell phone is on, operation proceeds from step 606 to step 608. In step 608, a determination is made as to whether a call can be successfully completed to the cell phone, e.g., a determination is made as to whether reception at the cell phone is good enough for the call to be received reliably. This determination may be done based on status information supplied by a base station which periodically receives status signals from the cell phone, with a failure to receive a status signal indicating that the cell phone is unavailable for call completion. If it is determined in step 608 that a cell phone call can not be successfully completed to the called cell phone, operation proceeds to step 630 where the reason the cell phone which is on can not be reached is determined. For example, it may be determined in step 630 that the cell phone is on but temporarily unreachable due to poor reception at the phone's current location or due to excessive cellular call volume in the cell where the phone is located. Operation proceeds from step 630 to step 632 where the determined reason why the call can not be successfully completed to the "on" cell phone is communicated to a control module used to control call processing. This module may be in the HLR node 166 or located elsewhere in the system, e.g., in a service control point or Intelligent peripheral device used to control call processing. Operation proceeds from step 632 to step 622 via GOTO node 607.

If in step 608, it is determined that a call to the called cell phone can be successfully completed, operation proceeds to step 610. In step 610 the BS in the cell in which the called cell phone is located is operated to signal the called cell phone and to indicate that there is an incoming call from a called party, e.g., a calling party identified by a calling party telephone number which is communicated to the called cell phone.

In step 612, the base station which transmitted the call signal, e.g., BS 106, monitors for a response from the called party, e.g., a signal from the called cell phone indicating that the call was answered or call disposition information indicated by the called party by making a call disposition selection without answering the call, e.g., by selecting a send-to-voice-mail, forward-call or reject-call option on the cell phone which is communicated to the BS 106. This call disposition information may be made after caller ID information is displayed to the called party on the cell phone to which the call was directed.

If in step 612, it is determined that the cell phone call was answered, operation proceeds to step 614. In step 614 the answered call is allowed to complete in the normal manner, e.g., with one of the call participates terminating the call by hanging up or selecting an end call option. From step 614 the method proceeds to step 650 in which processing of the received call stops.

If in step 612 it is determined that the call has not been answered, e.g., after a signal from the called cell phone has not been received answering the call within a predetermined amount of time, operation proceeds to step 616. In step 616, a signal is sent to the call processing control device, e.g., HLR node 166, indicating that a no-answer-call status has been determined. Operation proceeds from step 616 to step 622.

If in step 612 it is determined that call disposition information has been received by the BS 102 in response to the call directed to the called party, operation proceeds to step 620. In step 620 a signal is sent by the BS 106 to the call processing control module, e.g., in the HLR node 166, indicating a no-answer-call status and providing user supplied call disposition information, e.g., forward call to voice mail or forward to another number. Operation then proceeds to step 622.

In step 622, a determination is made as to whether the calling party number, available from caller ID information, corresponds to a number which is not to be provide phone status information. Caller telephone numbers which are not to be supplied telephone status information in accordance with the invention may be listed in a set of subscriber information stored, e.g., in the HLR node in association with the subscriber's number or at some other location accessible to the call processing control module. Alternatively, caller telephone numbers to which the phone status information is to be provided can be stored and all other caller telephone numbers can be treated as numbers to which the phone status information is not to be provided. This is particularly useful in cases where the phone status information is to be supplied to friends and family but not other callers. Numbers to which telephone status information is not to be provided may be considered as blocked numbers as opposed to calling party numbers which may be supplied with cell phone state information.

If the calling party number is a telephone number which is not blocked from being provided phone status, e.g., active state, information, operation proceeds to step 624. In step 624, the calling party is supplied with an audio message indicating the status for the called party's cell phone. The message may indicate that the called party's cell phone is: off; on but there is no answer; on but temporarily unreachable; on but busy; on but has activated call forwarding; or on but has activated forwarding to voice mail. The HLR node 166 can include a message generation module for providing such messages to the caller, an intelligent peripheral device may be used to generate the messages or another device, under control of the call processing control module responsible for controlling call processing, may be used to generate the audio message. Operation proceeds from step 624 to step 640.

If in step 622, it was determined that the calling party number was a number to which telephone status information was not to be provided, operation would have proceeded directly from step 622 to step 640. In step 640 a determination is made as to whether or not the called party indicated a call disposition operation. If no call disposition option was specified by the called party, operation proceeds from step 640 to step 642 in which the caller is provided an opportunity to be transferred to voice mail. This can be done by announcing to the caller that they can hang up or hold to be transferred to voice mail. Assuming that the caller selects to hold and be transferred to voice mail, operation proceeds to step 644 with transfer to voice mail being the call disposition to be implemented.

If in step 640, the called party indicated a call disposition option, operation proceeds from step 640 to step 644 with the called party selected call disposition option being the option to be implemented. In step 644, an announcement is played to the calling party indicating the call disposition being implemented, e.g., one of transfer to voice mail, forwarding to another number, or call termination. Operation proceeds from step 644 to step 646 in which the announced call disposition option is implemented, e.g., the call is forwarded to voice mail, forwarded to a number indicated by the called party, or terminated. Processing of the received call then stops in step 650.

In the above described manner, a calling party can be provided more information about the status of a cell phone than is normally available in current systems. Knowing that the cell phone is temporarily unreachable due to poor reception or because of cell loading conditions can encourage the caller to call back in a short amount of time or make an informed decision as to whether the caller would prefer to be transferred to voice mail.

Figure 7:
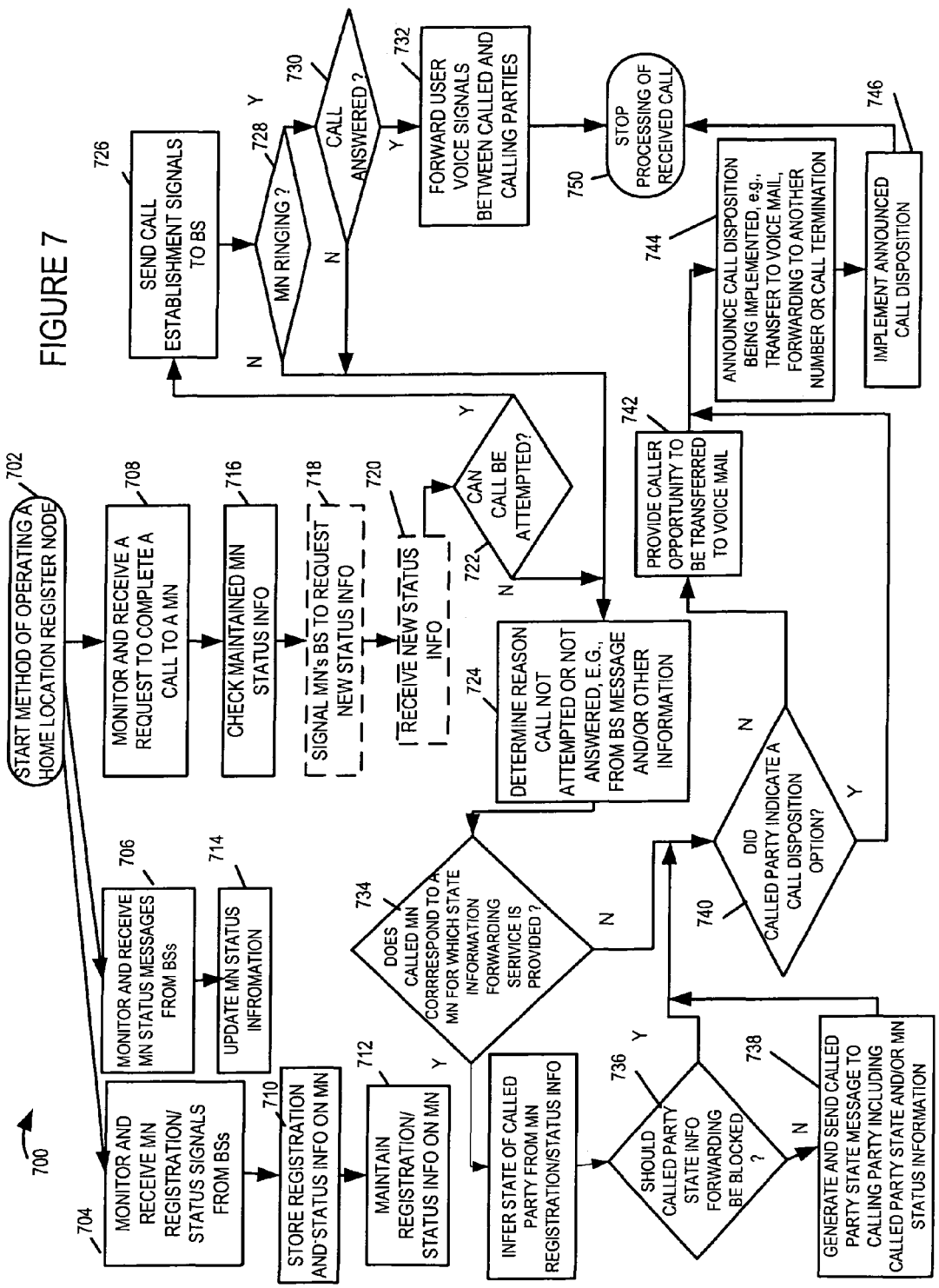
FIG. 7 is a flowchart of an exemplary method of operating a home location register node in accordance with the present invention.

FIG. 7 is a flowchart 700 of an exemplary method of operating a home location register node in accordance with the present invention. The home location register node may be one of a plurality of home location register nodes in a wireless cellular communications system, each home location register node responsible for storing and maintaining state information on a number of cell phones, e.g., mobile nodes. Operation starts in step 702, where the home location register node is powered on and initialized. The home location register node may have been previously assigned a set of mobile nodes, e.g., cell phones, and calls directed to the phone number assigned to the assigned set of mobile nodes will be directed to the home location register node for further routing, e.g., to one of a plurality of base stations in the cellular system. From start step 702 operation proceeds to steps 704, 706, and 708.

In step 704, the home location register node is operated to monitor and receive MN registration/status signals from BSs. Operation proceeds from step 704 to step 710 for each received registration. In step 710, the home location register node is operated to store registration and status information on an MN. For example, the registration signaling may identify that the MN has registered to use a specific base station within the cellular system as its point of network attachment, and that the MN is currently available to receive incoming calls. Operation proceeds from step 710 to step 712, in which the home location register node is operated to maintain registration/status information on the MN. This status information is updated periodically based on status information received from one or more BSs which are received in step 706.

In step 706, the home location register node is operated to monitor and receive MN status messages from BSs, e.g., status messages reporting a change of status of an MN already registered with the BS. For example, a status message may indicate that a MN is still registered, but is temporarily unavailable to receive an incoming call, e.g., due to poor reception, due to high system interference levels, due to user choice, due to an in progress call, due to high system loading, etc. Other exemplary updates of status information may include an indication that the MN is unavailable to receive incoming calls because the MN is no longer registered because the BS has de-registered the MN because the BS has not received any signaling from the MN for a specified time interval and assumes that the MN has either powered down or left its cellular coverage region. Operation proceeds from step 706 to step 714, in which the home location register node is operated to update the MN status information that it is maintaining based on the information received in step 706. The monitoring in step 706 is performed on an ongoing basis.

In step 708, the home location register node is operated to monitor and receive a request to complete a call to a MN, the called MN being one of the MNs whose home location register is the home location register node. The calling party can be a landline phone with the call placement request being communicated via a central office mode in a landline network or the calling party can be another MN, e.g., cell phone, in the wireless communications network with call initiation signaling being routed through a base station. Operation proceeds from step 708 to step 716.

In step 716, the home location register node is operated to check the stored MN status information to determine if a call can be attempted. In some embodiments optional steps 718 and 720 are performed. Operation proceeds from step 716 to step 718. In step 718, the home location register node, signals the MN's current attachment point base station to request new status information, and in step 720, the home location register node receives and processes any new status information from the MN attachment point BS. Operation proceeds from step 720 to step 722.

In step 722, the home location register node is operated to check if the call can be attempted based on the status information corresponding to the MN, e.g., if the registration information indicates that the MN is on, registered with a BS, and is not temporarily unavailable. If the home location register node determines that the call cannot be attempted based on the MN status information, e.g., MN not currently registered or MN registered but unavailable for any of a number of reasons operation proceeds to step 724, otherwise operation proceeds to step 726. In step 726, the home location register node sends call establishment signals to the called MN's registered BS. Operation proceeds from step 726 to step 728, where the home location register node checks if the called MN is ringing. If in step 728, it is determined that the called MN is not ringing operation proceeds to step 724, otherwise operation proceeds to step 730. In step 730, the home location register node checks as to whether the call was answered by the called MN. If in step 730, it was determined that the call was not answered within a predetermined time then operation proceeds to step 724; otherwise, operation proceeds to step 732. In accordance with the invention, a called party can respond by providing call disposition information without answering a call. Alternatively, the called party can enter call disposition information, e.g., forward to a particular landline number when on but temporarily unavailable or on but busy. Different call forwarding numbers can be provided for different conditions. In step 732, the home location register node is operated to cause forwarding of user voice signals between the called and calling parties. In some embodiments the user voice signals do not traverse the home location register node, but are routed via addressing information obtained from the home location register node. In other embodiments, the home location register node acts as the forwarding device.

Operation proceeds in the case of a no answer condition from step 728 or step 730 to step 724. Operation also proceeds in the case of an unattempted call from step 722 to step 724. In step 724, the home location register node is operated to identify the likely reason why the call was not attempted or was not answered based on the stored MN status information and information obtained from steps 722, 728, and/or 730. Exemplary reasons why the call was not answered include: high cell loading conditions, cell phone not currently registered, cell phone had been turned off, cell phone assumed off, cell phone temporarily in a location with poor reception, high system interference levels in cell, cell phone ringing but called party did not answer, called party provided call disposition information instructions rather than answer call, called party currently participating in an ongoing call.

Operation proceeds from step 724 to step 734. In some embodiments, some but not all cell phone subscribers may subscribe to a called party state forwarding service for unanswered calls. In step 734, the home location register node is operated to check as to whether the called MN is an MN for which called party cell phone state information forwarding is to be provided. In some embodiments, the called party state forwarding service for unanswered calls may be included as a built in feature of a service provider plan, e.g., a standard default feature of the service provider plan included without a specific line item charge for the feature. This feature may be supplied in combination with call forwarding to voice mail and/or selective call forwarding to numbers designated by the subscriber. If the called MN does have the state forwarding service for unanswered calls, then operation proceeds from step 734 to step 736; otherwise operation proceeds from step 734 to step 740.

In step 736, the home location register node checks if the called state forwarding should be blocked. For example, in some embodiments the called party may have subscribed to a state information blocking feature as well as the main state information service. Step 736 may include checking the calling party ID to determine if it is on a list of numbers to be denied cell phone state information. Alternatively, the calling party may be compared to a list of numbers to be provided cell phone state information, with all other numbers being treated as blocked. For example, in general the called party may desire that cell phone state information pertaining to unanswered calls be forwarded to the calling party to increase the likelihood that the calling party, e.g., a close family member, a friend, an associate, a client, a perspective customer, etc., will reattempt the call. However, there may be some individuals for which the reverse is true, e.g., a pesky relative, a persistent salesman, a demanding boss, a bill collector, an ex-boyfriend/girlfriend/husband/wife, etc., in which the blocking feature would be advantageous. Using lists of the calling party numbers, information can be blocked or provided as desired by the subscriber. In addition, at some times, e.g., on a vacation, an individual may not want to be reached by one or more individuals in which case the blocking feature would also be advantageous. In some embodiments, the called party subscribing to the blocking service can select in advance calling party numbers and/or times for which to apply the blocking service. In some embodiments, the called party can decide when the called cell phone rings, e.g., via a user ID feature, whether called party state information forwarding to the calling party should be blocked. In some such embodiments, the called party can, without answering the call, input a command to the mobile node, e.g., cell phone, resulting in signaling being directed to the home location register node signifying the intention to apply the blocking feature.

If in step 736, the home location register node determines that the state forwarding should be blocked then operation proceeds to step 740; otherwise operation proceeds to step 738.

In step 738, the home location register node is operated to generate and send an audio message to the calling party which includes inferred called party state information, e.g., that the called party is temporarily unavailable or is expected to be unavailable for an extended period of time. The message may also include the mobile node state information indicating the reason the called party is unavailable and indicate how long the called party has been unavailable, e.g., by communicating the time when the called party became unavailable or the total time the called party has been unavailable. For example, the message may indicate "the called party is temporarily unavailable due to signal interference and has been unavailable since 5 pm" or "the called party is temporarily unavailable due to signal interference and has been unavailable for the last 3 minutes". In the case where long term unavailability has been inferred, the message may be, for example, "The called party is presently unavailable due to signal interference and is expected to be unavailable for an extended period of time. The called party has been unavailable for the last 40 minutes." Obviously, numerous variations on the message and its contents are possible.

Operation proceeds from step 738 to step 740. In step 740 the home location register node is operated to determine whether the called party indicated a call disposition option. If the called party did not indicate a call disposition option, then operation proceeds from step 740 to step 742; otherwise, operation proceeds from step 740 to step 744. In step 742 the home location register node is operated to provide the caller with an opportunity to be transferred to voice mail. Operation proceeds from step 742 to step 744. In step 744, the home location register node is operated to announce the call disposition being implemented, e.g., transfer to voice mail, forwarding to another number or call termination. Operation proceeds from step 744 to step 746. In step 746, the home location register node is operated to implement the announced call disposition of step 744. Operation proceeds from step 746 to step 750, where the home location register node stops processing of the received call.

Figure 8:
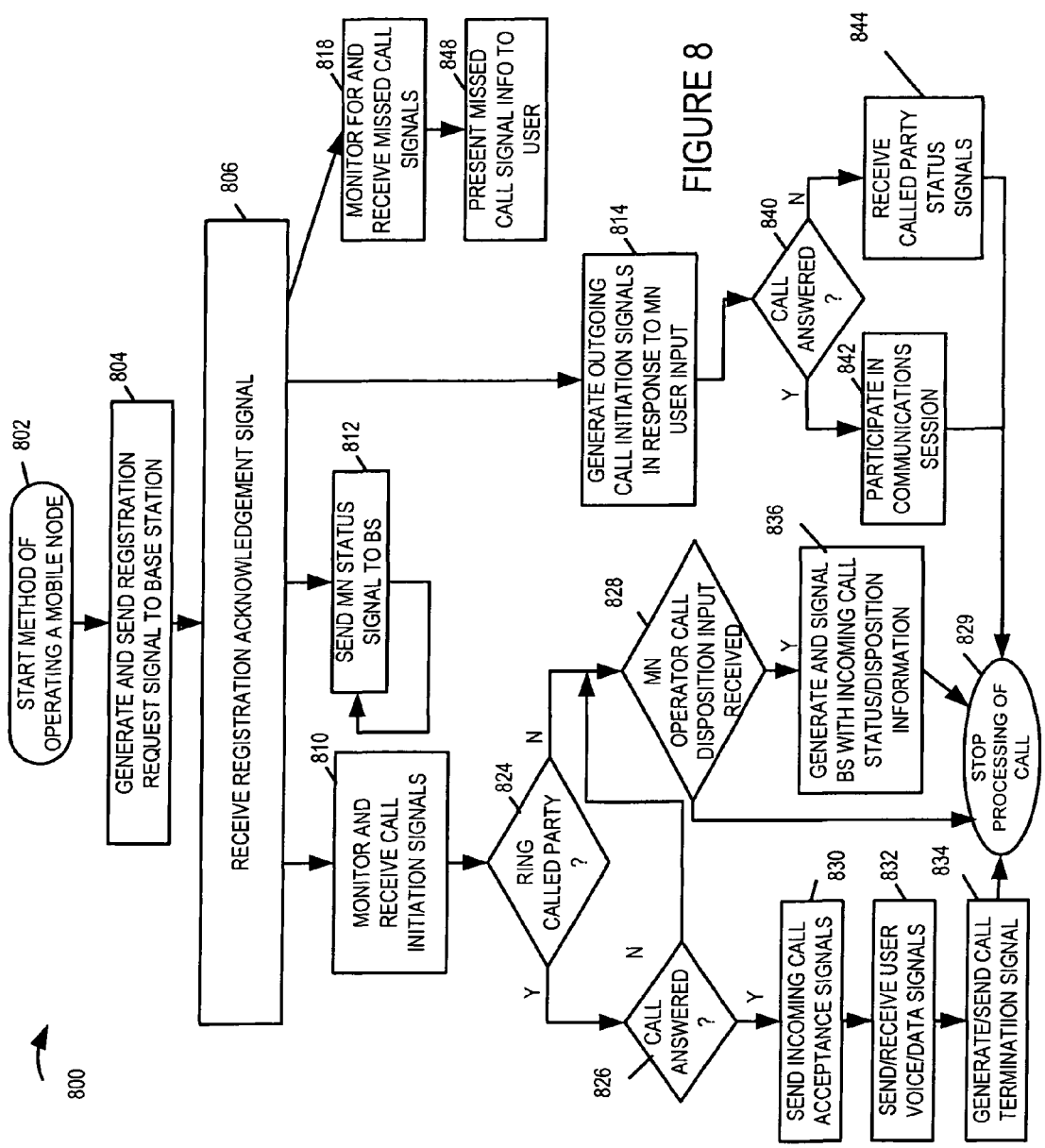
FIG. 8 is a flowchart of an exemplary method of operating a cell phone, e.g., mobile node, in accordance with the present invention.

FIG. 8 is a flowchart 800 of an exemplary method of operating a cell phone, e.g., mobile node, in accordance with the present invention. The mobile node may be one of a plurality of mobile nodes in a wireless cellular communications system. Operation starts in step 802, where the mobile node is powered on and initialized. Operation proceeds from step 802 to step 804. In step 804, the mobile node is operated to generate and send a registration request signal to a base station, e.g., to the base station that the mobile node desires to use as its point of network attachment, in whose cellular coverage region the mobile node is currently located. Operation proceeds from step 804 to step 806.

In step 806, the mobile node is operated to receive a registration acknowledgement signal from the base station in response to the registration request signal, indicating that the base station has accepted the mobile node and that mobile node registration information is being or has been communicated to the MN's home location register node. If the base station had received the registration request signal or had received the registration request and had decided not to accept the MN for registration, the base station may not communicate a registration acknowledgement signal, and the mobile node may attempt to repeat step 804 at a later time, e.g., on an iterative basis until a positive registration acknowledgement is received from a base station.

With registration having been completed in step 806, operation proceeds from step 806 to steps 810, 812, 814, and 818 which correspond to processes which may occur in parallel during the period of mobile node operation.

In step 810, the MN is operated to monitor and receive call initiation signals from the base station directed to the MN. Operation proceeds from step 810 to step 824. In step 824, the MN is operated to decide if the phone of the called party, e.g., cell phone owner, should be rung. In some embodiments, the MN, having received a call initiation signal may decide not to ring the user, e.g., based upon a user prior input command to redirect received calls and/or to screen incoming calls, based upon current reception conditions. If the MN decides in step 824 to ring the called party, operation proceeds from step 824 to step 826; otherwise operation proceeds from step 824 to step 828.

In step 826, the MN tests if the call is answered. If the MN detects that the call is being answered in step 826, then operation proceeds to step 830; otherwise operation proceeds to step 828. In step 830, the MN is operated to send incoming call acceptance signals to the base station, and then in step 832 the MN sends and receives user voice/data signals as the MN participates in a communication session with the calling party. Operation proceeds from step 832 to step 834. In step 834, the MN is operated to generate/send call termination signals to the base station, e.g., the call termination signals being in response to the MN user hanging-up. Operation proceeds from step 834 to step 829, where the mobile node stops processing of the call.

Returning to step 828, in step 828 the MN checks whether the MN has received MN operator call disposition input. The input may have been received prior to or subsequent to the reception of the call initiation signal corresponding to the call. For example, a MN user may have decided prior to the incoming call under consideration to temporarily transfer each of the incoming calls or may have selected, e.g., by calling party number, incoming calls to receive. As another example, a mobile node user may have decided after the ringing to transfer a specific call, e.g., based upon caller ID info, based upon inconvenient timing, or based upon knowledge that the mobile node user is currently located at the site of a landline phone to which the call will be transferred resulting in superior call quality, and the mobile node user may have performed an input operation on his/her mobile node, e.g., cell phone, to initiate the transfer operation.

If in step 828, no input was received from the user of the mobile node, processing of the incoming call stops in step 829. However, monitoring in step 810 for additional calls will continue. However if in step 828, it is determined that the MN operator has input a call disposition input applicable to the received incoming call, operation proceeds to step 836. In step 836, the MN is operated to generate and signal the BS with the incoming call status/disposition information. Operation proceeds from step 836 to step 829.

Returning to step 812, in step 812, which may be performed periodically while the MN is turned on, the MN is operated to send status signals to the base station, e.g., a signal indicating that the MN is present and active.

Referring now to step 814, in step 814 the MN is operated to generate outgoing call initiation signals in response to MN user input, e.g., the user places a call to another mobile node, e.g., another cell phone, or to a landline phone. Operation proceeds from step 814 to step 840. In step 840, the MN checks whether the call is answered. If the call is answered operation proceeds from step 840 to step 842; otherwise operation proceeds to step 844. In step 842, the MN is operated to participate in a communication session with the called party. In step 844, the MN is operated to receive called party status signals, if communicated to the MN. For example, the called party may be another MN which has the "called party unanswered call state forwarding service," and the home location register node of that called MN may send a message indicating a specific reason why the call was unanswered, e.g., current reception is poor.

Returning to step 818, in step 818 the MN is operated to monitor and receive missed call signals. The missed call signals may include information showing the calling party identification information, e.g., phone number, date/time tag information, reason for the missed call, call transfer information, and/or called party state information communicated to the calling party. In response to received missed-call signals, operation proceeds from step 818 to step 848. In step 848, the MN is operated to present missed-call signal information to the MN user.

Figure 9:
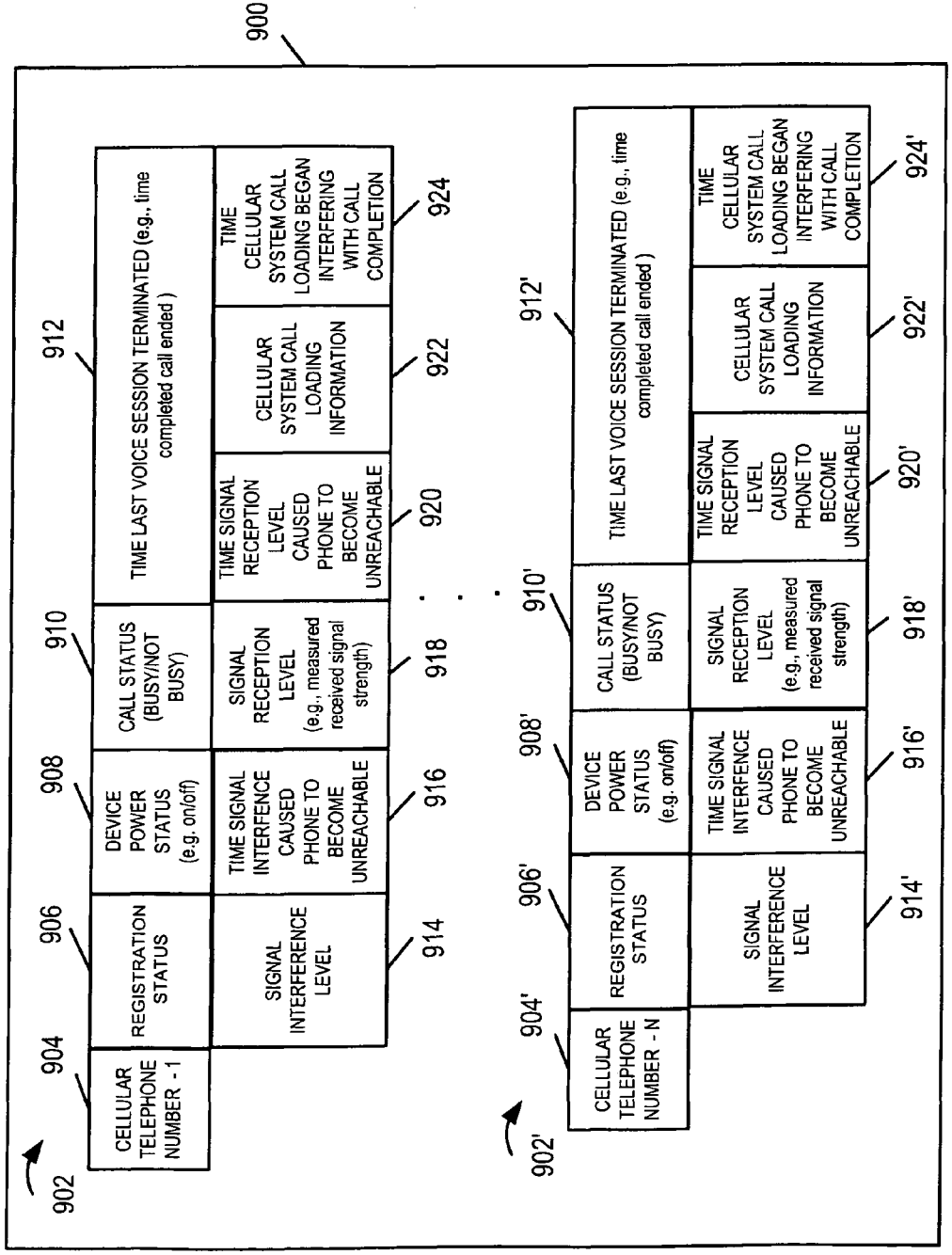
FIG. 9 illustrates a database of cellular phone state information which is maintained and used in accordance with various embodiments of the invention.

FIG. 9 is a drawing of an exemplary database 900 implemented in accordance with the present invention and using methods of the present invention. In some embodiments, exemplary database 900 is included as part of a home location registration node, e.g., exemplary home location registration node 200 of FIG. 2. In some embodiments, exemplary database 900 is located outside of the home location registration node. In some embodiments, the home location registration node uses the information included in database 900 to perform the methods of the present invention including determining called cell phone status and making inferences about the called party's status, e.g., whether the called party is temporarily unavailable or is expected to be unavailable for a long period of time. The stored information may include information indicating the time the called party became unavailable for a particular reason. It may also include information indicating the desired call disposition to be performed when the called party is unavailable. Different call dispositions may depend on whether the called party is inferred to be temporarily unavailable, as compared to when the called party is inferred to be unavailable for an extended period of time. For example, in the case of temporary unavailability or unavailability due to signal interference, the called party may specify that the incoming call be transferred to a landline phone if one has been specified, while in the case of long term unavailability the called party may set information indicating that the call is to be transferred to voice mail.

Database 900 includes a plurality of sets of information (information set 1 902, information set N 902'), each set corresponding to a cellular telephone number for which the "called party cell phone state/inferred called party status information forwarding service" is implemented. First information set 902 includes cellular telephone number 1 904, registration status 906, device power status (e.g., on/off) 908, call status (busy/not busy) 910, time last voice session terminated (e.g., time completed call ended) 912, signal interference level 914, time signal interference caused phone to become unreachable 916, signal reception level (e.g., measured received signal strength) 918, time signal reception level caused phone to become unreachable 920, cellular system call loading information 922, and time cellular system call loading began interfering with call completion 924. Nth information set 902' includes cellular telephone number N 904', registration status 906', device power status (e.g., on/off) 908', call status (busy/not busy) 910', time last voice session terminated (e.g., time completed call ended) 912', signal interference level 914', time signal interference caused phone to become unreachable 916', signal reception level (e.g., measured received signal strength) 918', time signal reception level caused phone to become unreachable 920', cellular system call loading information 922', and time cellular system call loading began interfering with call completion 924'.

Figure 10:
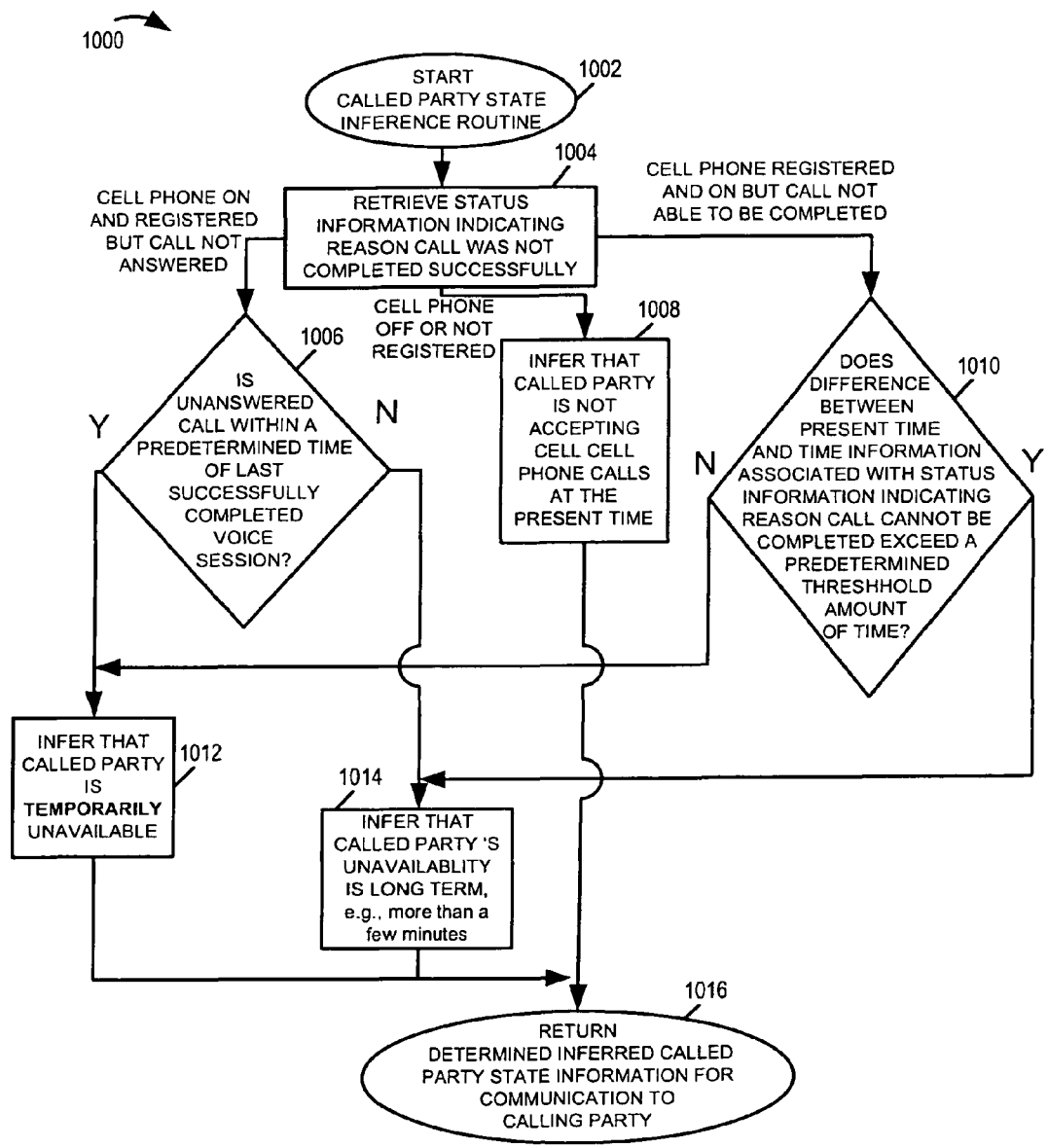
FIG. 10 illustrates a routine for inferring the state of a called party in accordance with one exemplary embodiment of the invention from status information maintained in the exemplary database of FIG. 9.

FIG. 10 is a flowchart 1000 of an exemplary called party state inference routine in accordance with the present invention. The method of the steps of flowchart 1000 may be performed by a home location registration node, e.g., node 200 of FIG. 2, implemented in accordance with the present invention. In accordance with the method shown in FIG. 10, user unavailability for an extended period of time, e.g., more than a threshold period which can be specified by the user in some embodiments or set by the system, results in an inference that the called party's unavailability is long term. However, in the case of the unavailability having only just occurred, or having a duration less than the predetermined threshold, it is usually inferred, if the called party's cell phone is registered, that the unavailability is temporary. Thus, while the called party may be unavailable for a particular reason, additional information, such as the duration for which the called party has been unavailable, can produce an inference of temporary or long term unavailability. In the case of an inference of temporary unavailability this is usually communicated to the calling party by an announcement that the called party is "temporarily unavailable" with the reason being communicated in the same message to the caller. In the case of inferred long term unavailability, the caller may be notified that the party is unavailable along with the reason that the called party is unavailable, e.g., the calling party may receive an audio announcement that "the called party is currently unavailable due to signal interference". The amount of time the called party has been unavailable due to the particular condition may also be communicated to the calling party in the case of an inference of either temporary or long term unavailability because of a particular condition. For example, the calling party may be played the message "the called party is unavailable due to signal interference and has been unavailable for the last 5 minutes".

Operation of the called party state inference routine starts in step 1002 and proceeds to step 1004. In step 1004 status information is retrieved indicating the reason the call was not successfully completed. If the retrieved status indicates that the cell phone is registered and on but the call was not answered, then operation proceeds from step 1004 to step 1006. If the retrieved status indicates that the cell phone is off or is not registered, operation proceeds from step 1004 to step 1008. If the retrieved status indicates that the cell phone is registered and on but the call is not able to be completed, then operation proceeds from step 1004 to step 1010.

In step 1006, a check is performed as to whether the unanswered call is within a predetermined time of the last successfully completed voice session. If the unanswered call was within a predetermined time of last successfully completed call, then operation proceeds from step 1006 to step 1012; otherwise operation proceeds from step 1006 to step 1014.

Returning to step 1010, in step 1010 it is determined whether the difference between the present time and time information associated with status information indicating the reason the call cannot be completed exceeds a predetermined threshold amount of time. If it is determined that the difference exceeds the predetermined threshold amount of time then operation proceeds from step 1010 to step 1014; otherwise operation proceeds from step 1010 to step 1012.

If operation proceeds to step 1012, in step 1012 it is inferred that the called party is temporarily unavailable. If operation proceeds to step 1014, in step 1014 it is inferred that the called party's unavailability is long term, e.g., more than a few minutes. Operation proceeds from step 1012 or step 1014 to step 1016.

Returning to step 1008, in step 1008, it is inferred that the called party is not accepting cell phone calls at the present time. Operation proceeds from step 1008 to step 1016. In step 1016, the routine returns the determined inferred called party state information for communication to the calling party.

In various embodiments elements described herein are implemented using one or more modules to perform the steps corresponding to one or more methods of the present invention. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware which may be part of a test device, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A method for servicing a call from a calling party to a cellular telephone corresponding to a called party, the method comprising:

operating a device in a communications network to detect a call to said cellular telephone;

operating said device to determine from stored telephone status information the status of said cellular telephone, wherein at least a portion of said stored information other than the registration was stored prior to detecting the call;

when the call is not successfully completed to the called party, operating said device to communicate called party state information to the calling party;

operating said device to store telephone state information corresponding to the called party's cellular phone based on a registration signal automatically sent to a base station from the called party's cellular phone upon the called party's cellular phone being powered on; and operating said device to forward the detected call to voice mail when said telephone state information indicates that the called cellular telephone is registered but is not reachable for an extended period of time, said extended period of time being at least 10 minutes.

2. A method for servicing a call from a calling party to a cellular telephone corresponding to a called party, the method comprising:
   operating a device in a communications network to detect a call to said cellular telephone;
   operating said device to determine from stored telephone status information the status of said cellular telephone indicating that the cellular telephone is busy with an ongoing call and the cellular telephone is on, wherein at least a portion of said stored information other than the registration was stored prior to detecting the call; and
   when the call is not successfully completed to the called party, operating said device to communicate called party state information to the calling party, said step of operating said device to communicate including:
      inferring, as a function of stored information indicating a time of a last successfully completed voice call in which the cellular telephone was involved, that the called party is temporarily unavailable and is temporarily away from their cellular telephone;
      providing an audio message indicating the inferred state of the called party to the calling party; and
      communicating information indicating that the cellular telephone is on, the called party is temporarily unavailable, that the cellular telephone is busy with an ongoing call, and that the called party is temporarily away from their cellular telephone.

3. The method of claim 2, wherein said inference includes determining that the called party is temporarily away from their cellular telephone if said detected call is within a predetermined amount of time from the time of said last successfully completed voice call.

4. A method for servicing a call from a calling party to a cellular telephone corresponding to a called party, the method comprising:
   operating a device in a communications network to detect a call to said cellular telephone;
   operating said device to determine from stored telephone status information the status of said cellular telephone, including indicating whether the cellular telephone is subject to poor reception; and wherein at least a portion of said stored information other than the registration was stored prior to detecting the call; and
   when the call is not successfully completed to the called party, operating said device to communicate called party state information to the calling party, said step of operating said device to communicate including:
      inferring, as a function of the reception quality indicated by said stored state information, the state of the called party from the stored telephone status information;
      providing an audio message indicating the inferred state of the called party to the calling party; and
      communicating information indicating the status of the cellular telephone to the calling party.

5. The method of claim 4,
   wherein when the cellular telephone status information indicates that the cellular telephone is subject to poor reception, said step of inferring the state of the called party includes examining time information associated with said reception state information to determine the length of time the cellular phone has been unable to receive calls due to poor reception; and
   wherein it is inferred that the called party is temporarily unavailable when the determined length of time the cellular phone has been unavailable is below a threshold amount of time.

6. The method of claim 5,
   wherein the step of communicating the inferred state of the called party includes communicating that the called party is temporarily unavailable when it is inferred that the called party is temporarily unavailable; and
   wherein communicating the status of the cellular telephone includes indicating that the cellular telephone is subject to poor reception when the stored state information indicates that the call can not be completed due to poor reception.

7. A method for servicing a call from a calling party to a cellular telephone corresponding to a called party, the method comprising:
   operating a device in a communications network to detect a call to said cellular telephone;
   operating said device to determine from stored telephone status information the status of said cellular telephone indicating that the cellular telephone is subject to system capacity limitations which will not permit the call to be completed, wherein at least a portion of said stored information other than the registration was stored prior to detecting the call; and
   when the call is not successfully completed to the called party, operating said device to communicate called party state information to the calling party, said step of operating said device to communicate including:
      inferring from the stored telephone status information that the called party is temporarily unavailable;
      providing an audio message indicating the inferred state of the called party to the calling party; and
      communicating information indicating the status of the cellular telephone to the calling party, including that the called party is temporarily unavailable and system overloading which prevents calls from being completed to the cell phone.

8. A method for servicing a call from a calling party to a cellular telephone corresponding to a called party, the method comprising:
   operating a device in a communications network to detect a call to said cellular telephone;
   operating said device to determine-from stored telephone status information the status of said cellular telephone indicating that the cellular telephone is subject to signal interference, wherein at least a portion of said stored information other than the registration was stored prior to detecting the call; and
   when the call is not successfully completed to the called party, operating said device to communicate called party state information to the calling party, said step of operating said device to communicate including:
      inferring from the stored telephone status information that the state of the called party is that the called party is temporarily unavailable;
      providing an audio message indicating the inferred state of the called party to the calling party;
      communicating to the calling party information indicating that the called party is temporarily unavailable; and
      indicating that the cellular telephone is subject to signal interference.

9. A method for servicing a call from a calling party to a cellular telephone corresponding to a called party, the method comprising:

operating a device in a communications network to detect detecting a call to said cellular telephone;

operating said device to determine from stored telephone status information, including indicating the time of the last completed telephone call in which said cellular telephone was used, the status of said cellular telephone, wherein at least a portion of said stored information other than the registration was stored prior to detecting the call; and when the call is not successfully completed to the called party, operating said device to communicate called party state information to the calling party, said step of operating said device to communicate including:

inferring the state of the called party from the stored telephone status information; and providing an audio message indicating the inferred state of the called party to the calling party.

10. A method for servicing a call from a calling party to a cellular telephone corresponding to a called party, the method comprising:

operating a device in a communications network to detect a call to said cellular telephone;

operating said device to determine from stored telephone status information the status of said cellular telephone, wherein at least a portion of said stored information other than the registration was stored prior to detecting the call; and when the call is not successfully completed to the called party, operating said device to communicate called party state information to the calling party, said step of operating said device to communicate including:

inferring the state of the called party from the stored telephone status information, including as a function of stored information indicating the time of the last successfully completed telephone call in which the cellular telephone was used;

providing an audio message indicating the inferred state of the called party to the calling party; and communicating information indicating the status of the cellular telephone to the calling party.

11. The method of claim 7, wherein said inference includes determining that the called party is temporarily unavailable from their cellular telephone when said last successfully completed telephone call is within a predetermined amount of time from the time of said detected telephone call.

12. A method for servicing a call from a calling party to a cellular telephone corresponding to a called party, the method comprising:

operating a device in a communications network to detect a call to said cellular telephone;

operating said device to determine from stored telephone status information the status of said cellular telephone, wherein at least a portion of said stored information other than the registration was stored prior to detecting the call;

when the call is not successfully completed to the called party, operating said device to communicate called party state information to the calling party; and operating said device to update said stored set of telephone status information when a change in the operational status of said cellular telephone is detected, said updating including storing information indicating the time the cellular telephone became unavailable due to poor reception or signal interference.

13. A method for servicing a call from a calling party to a cellular telephone corresponding to a called party, the method comprising:

operating a device in a communications network to detect a call to said cellular telephone;

operating said device to determine from stored telephone status information the status of said cellular telephone, wherein at least a portion of said stored information other than the registration was stored prior to detecting the call;

when the call is not successfully completed to the called party, operating said device to communicate called party state information to the calling party; and operating said device to update said stored set of telephone status information to indicate a time a voice call originating from said cellular telephone or a voice call terminating at said cellular telephone is successfully completed following an exchange of at least some voice signals through said cellular telephone as part of the successfully completed call.

14. The method of claim 1, wherein said device is a home location register.

15. The method of claim 2, wherein said device is a home location register.

16. The method of claim 4, wherein said device is a home location register.

17. The method of claim 7, wherein said device is a home location register.

18. The method of claim 8, wherein said device is a home location register.

19. The method of claim 9, wherein said device is a home location register.

20. The method of claim 10, wherein said device is a home location register.

21. The method of claim 12, wherein said device is a home location register.

22. The method of claim 13, wherein said device is a home location register.

* * * * *